US011995013B2

(12) United States Patent
Lim et al.

(10) Patent No.: US 11,995,013 B2
(45) Date of Patent: May 28, 2024

(54) DIRECT MEMORY ACCESS (DMA) CONTROLLER ISSUES MEMORY ACCESS REQUESTS WHEREAS MEMORY LOCATIONS HAVING ADDRESSES WHICH ARE OFFSET AMOUNTS RELATIVE TO DESTINATION TEMPLATE ADDRESS

(71) Applicant: Arm Limited, Cambridge (GB)

(72) Inventors: Seow Chuan Lim, Cambridge (GB); Zhuoran Wang, Cambridge (GB); Gergely Tóth, Budapest (HU); Péter Czakó, Budapest (HU); Barnabás Sipos, Budapest (HU); Dezso Imre Novak, Budapest (HU)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/822,473

(22) Filed: Aug. 26, 2022

(65) Prior Publication Data

US 2023/0064619 A1    Mar. 2, 2023

(30) Foreign Application Priority Data

Sep. 1, 2021  (GB) ..................................... 2112445

(51) Int. Cl.
*G06F 13/00* (2006.01)
*G06F 12/02* (2006.01)
(Continued)

(52) U.S. Cl.
CPC .......... *G06F 13/28* (2013.01); *G06F 12/0238* (2013.01); *G06F 13/1668* (2013.01)

(58) Field of Classification Search
CPC ... G06F 13/28; G06F 12/0238; G06F 13/1668
See application file for complete search history.

(56) References Cited

U.S. PATENT DOCUMENTS 8,166,275 B2 * 4/2012 Drori ...................... G06F 13/28
                                              711/202
8,751,701 B2 * 6/2014 Shahar ................... G06F 13/28
                                              710/22

(Continued)

OTHER PUBLICATIONS

Combined Search and Examination Report issued for application No. GB2112445.8, dated Feb. 1, 2022.

*Primary Examiner* — Tammara R Peyton
(74) *Attorney, Agent, or Firm* — NIXON & VANDERHYE P.C.

(57) ABSTRACT

A direct memory access (DMA) controller comprises template storage circuitry to store at least one DMA template indicative of a DMA data access pattern. Each DMA template comprises enable indications settable to an enable state or a disable state. In response to a DMA command associated with a source address, a destination address, a source DMA template, and a destination DMA template, DMA control circuitry generates a set of DMA memory access requests to copy data from source memory system locations to destination memory system locations. The source/destination memory system locations are selected to have addresses which are offset relative to the source/destination address by offset amounts corresponding to positions of enable indications set to the enable state within the source/destination DMA template. The source/destination DMA templates allow irregular patterns of DMA accesses to be controlled in fewer DMA commands.

15 Claims, 16 Drawing Sheets

(51) Int. Cl.
*G06F 13/16* (2006.01)
*G06F 13/28* (2006.01)

(56) References Cited

U.S. PATENT DOCUMENTS

| | | | |
|---|---|---|---|
| 11,003,606 B2* | 5/2021 | Birsan | G06F 13/28 |
| 11,855,898 B1* | 12/2023 | Baumann | H04L 47/2441 |
| 2008/0052460 A1 | 2/2008 | Drori et al. | |
| 2013/0166793 A1 | 6/2013 | Sharar et al. | |
| 2020/0026461 A1 | 1/2020 | Tune | |
| 2020/0401540 A1 | 12/2020 | Birsan et al. | |

* cited by examiner

DIRECT MEMORY ACCESS (DMA) CONTROLLER ISSUES MEMORY ACCESS REQUESTS WHEREAS MEMORY LOCATIONS HAVING ADDRESSES WHICH ARE OFFSET AMOUNTS RELATIVE TO DESTINATION TEMPLATE ADDRESS

CROSS-REFERENCE TO RELATED APPLICATIONS

This application claims priority pursuant to 35 U.S.C. 119(a) to United Kingdom Application No. 2112445.8, filed Sep. 1, 2021, which application is incorporated herein by reference in its entirety.

FIELD

The present technique relates to the field of direct memory access (DMA).

BACKGROUND

Direct memory access (DMA) is a technique which allows a hardware device other than a processor to issue memory access requests to a memory system. This can allow the processor to offload performance-intensive operations for moving data around in memory to a DMA controller to free up time for the processor to carry out other tasks.

SUMMARY OF THE INVENTION

At least some examples provide a direct memory access (DMA) controller comprising: a command interface to receive DMA commands; DMA control circuitry to generate DMA memory access requests to be issued to a memory system, based on the DMA commands; and template storage circuitry to store at least one DMA template indicative of a DMA data access pattern, each DMA template comprising a plurality of enable indications each settable to one of an enable state and a disable state; in which: in response to a DMA command associated with a source address, a destination address, a source DMA template, and a destination DMA template, the DMA control circuitry is configured to generate a set of DMA memory access requests to copy data from a plurality of source memory system locations to a plurality of destination memory system locations, in which: the DMA control circuitry is configured to select the plurality of source memory system locations to have addresses which are offset relative to the source address by offset amounts corresponding to positions of enable indications set to the enable state within the source DMA template; and the DMA control circuitry is configured to select the plurality of destination memory system locations to have addresses which are offset relative to the destination address by offset amounts corresponding to positions of enable indications set to the enable state within the destination DMA template.

At least some examples provide a method for controlling direct memory access (DMA), the method comprising: receiving a DMA command associated with a source address, a destination address, a source DMA template, and a destination DMA template, the source DMA template and the destination DMA template each comprising a plurality of enable indications each settable to one of an enable state and a disable state, and in response to the DMA command: selecting a plurality of source memory system locations having addresses which are offset relative to the source address by offset amounts corresponding to positions of enable indications set to the enable state within the source DMA template; selecting a plurality of destination memory system locations to have addresses which are offset relative to the destination address by offset amounts corresponding to positions of enable indications set to the enable state within the destination DMA template; and generating a set of DMA memory access requests to copy data from the plurality of source memory system locations to the plurality of destination memory system locations.

At least some examples provide a computer-readable medium to store computer-readable code for fabrication of a direct memory access (DMA) controller comprising: a command interface to receive DMA commands; DMA control circuitry to generate DMA memory access requests to be issued to a memory system, based on the DMA commands; and template storage circuitry to store at least one DMA template indicative of a DMA data access pattern, each DMA template comprising a plurality of enable indications each settable to one of an enable state and a disable state; in which: in response to a DMA command associated with a source address, a destination address, a source DMA template, and a destination DMA template, the DMA control circuitry is configured to generate a set of DMA memory access requests to copy data from a plurality of source memory system locations to a plurality of destination memory system locations, in which: the DMA control circuitry is configured to select the plurality of source memory system locations to have addresses which are offset relative to the source address by offset amounts corresponding to positions of enable indications set to the enable state within the source DMA template; and the DMA control circuitry is configured to select the plurality of destination memory system locations to have addresses which are offset relative to the destination address by offset amounts corresponding to positions of enable indications set to the enable state within the destination DMA template.

The computer-readable medium may be a non-transitory storage medium.

BRIEF DESCRIPTION

Further aspects, features and advantages of the present technique will be apparent from the following description of examples, which is to be read in conjunction with the accompanying drawings, in which:

FIG. 1 schematically illustrates an example of a data processing system having a DMA controller;

Figure 13:
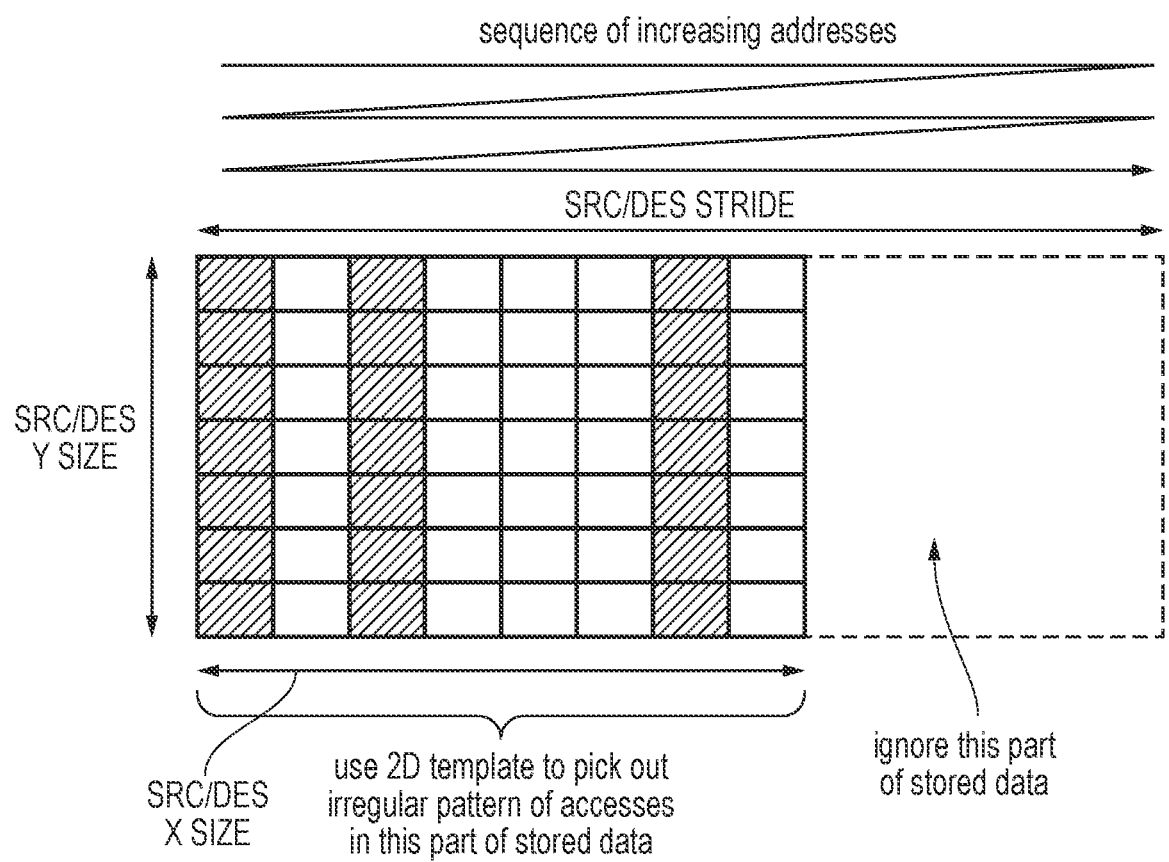
Figure 14:
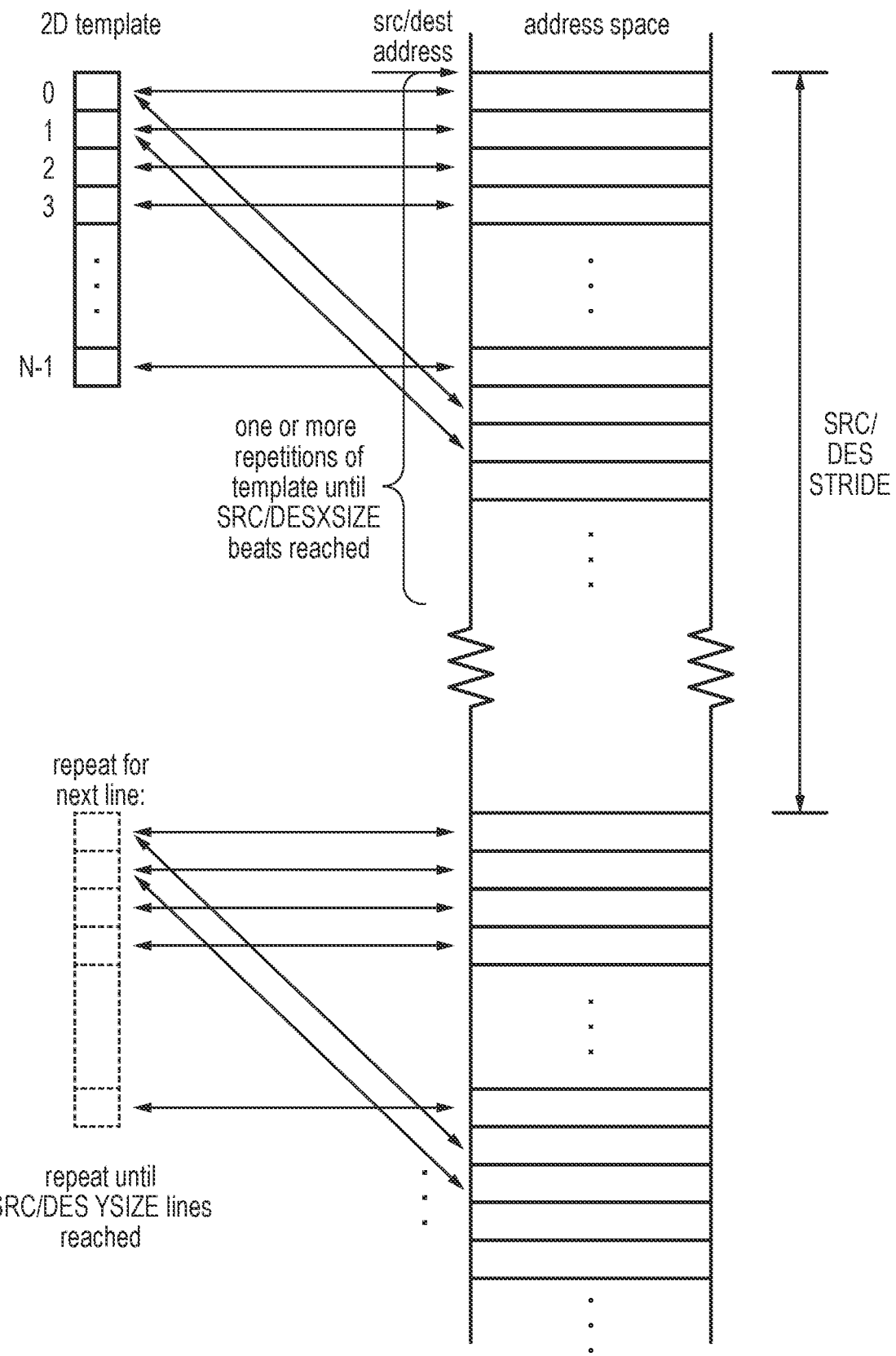
Figure 15:
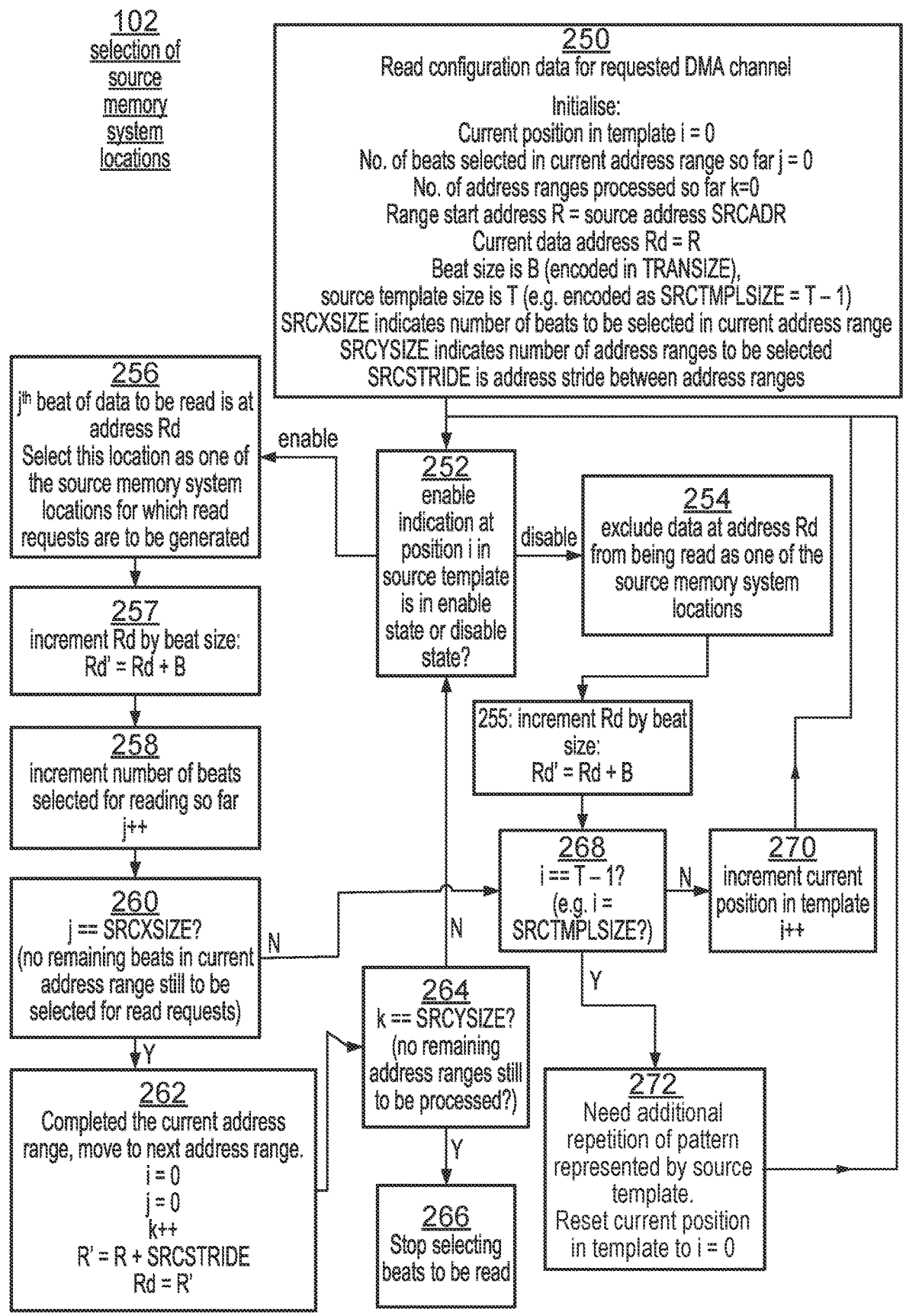
Figure 16:
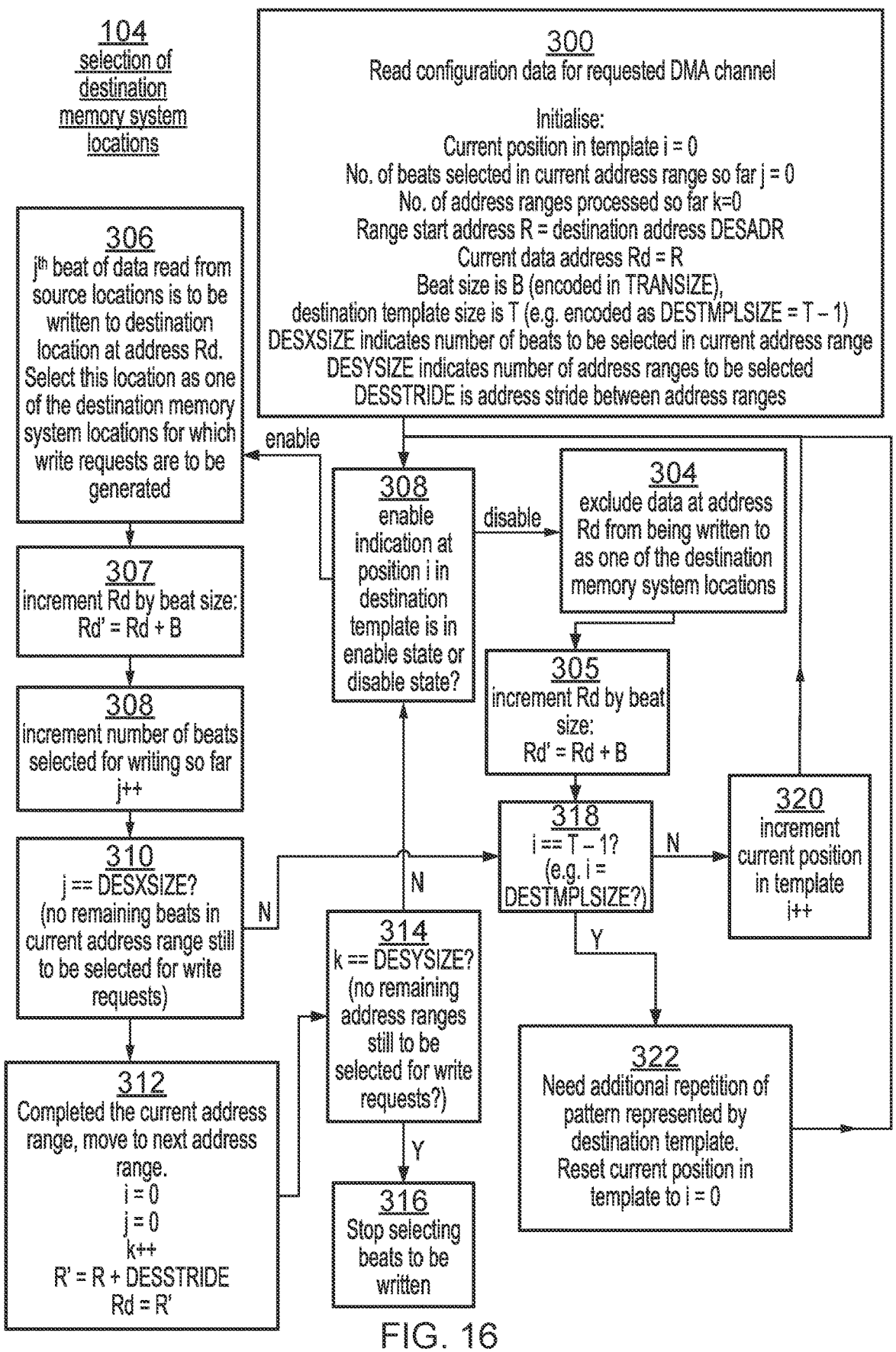
Figure 17:
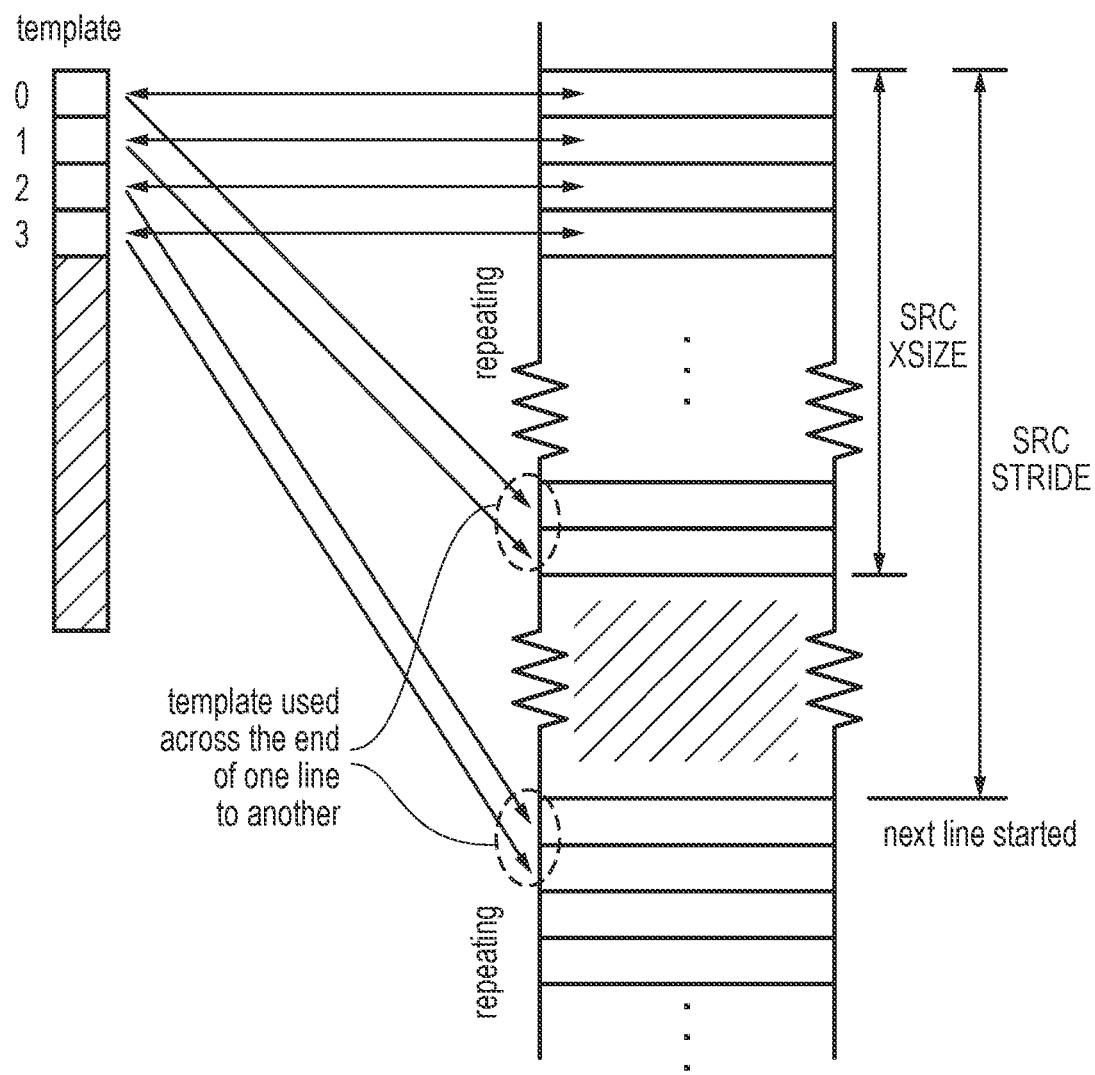
Figure 18:
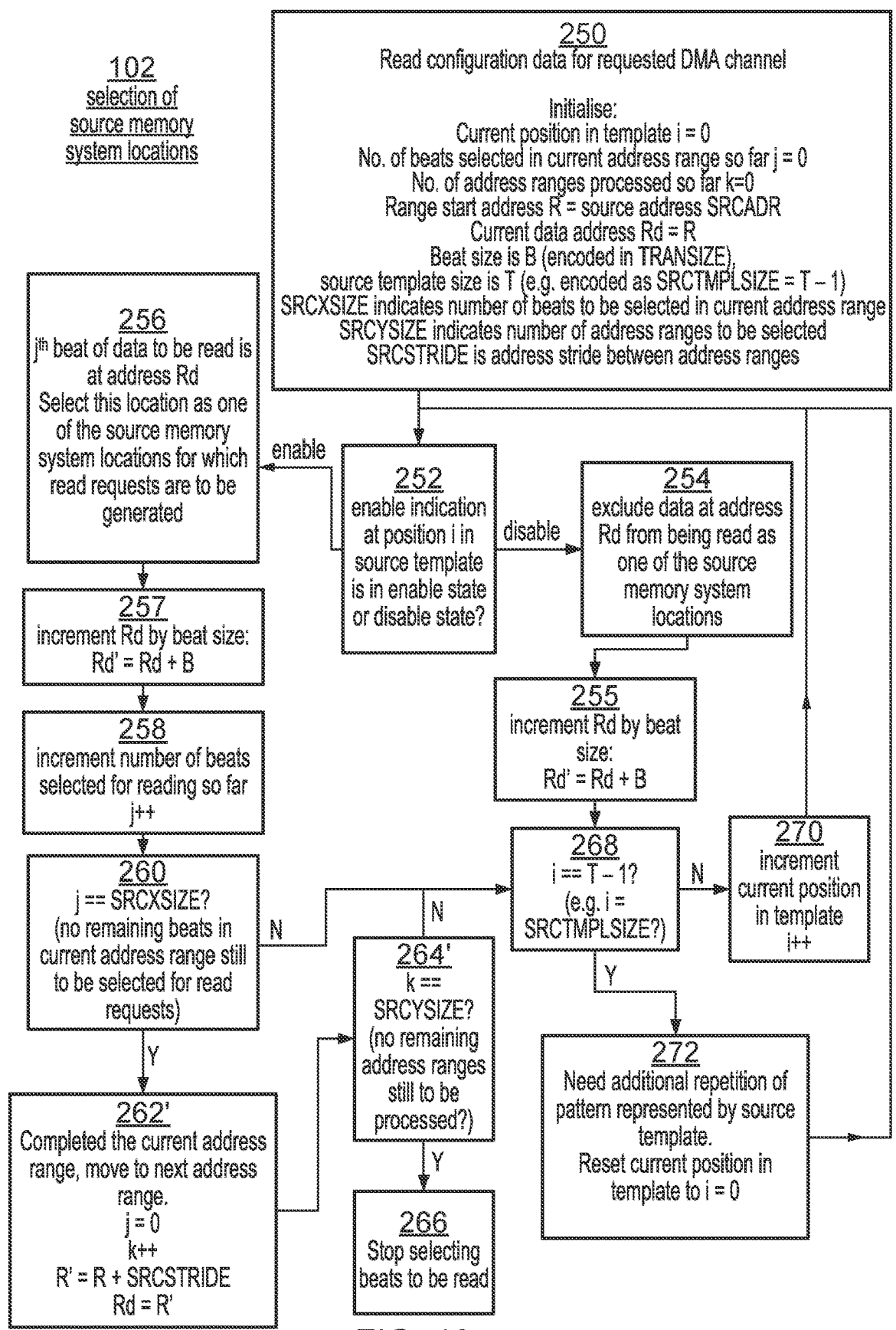
Figure 19:
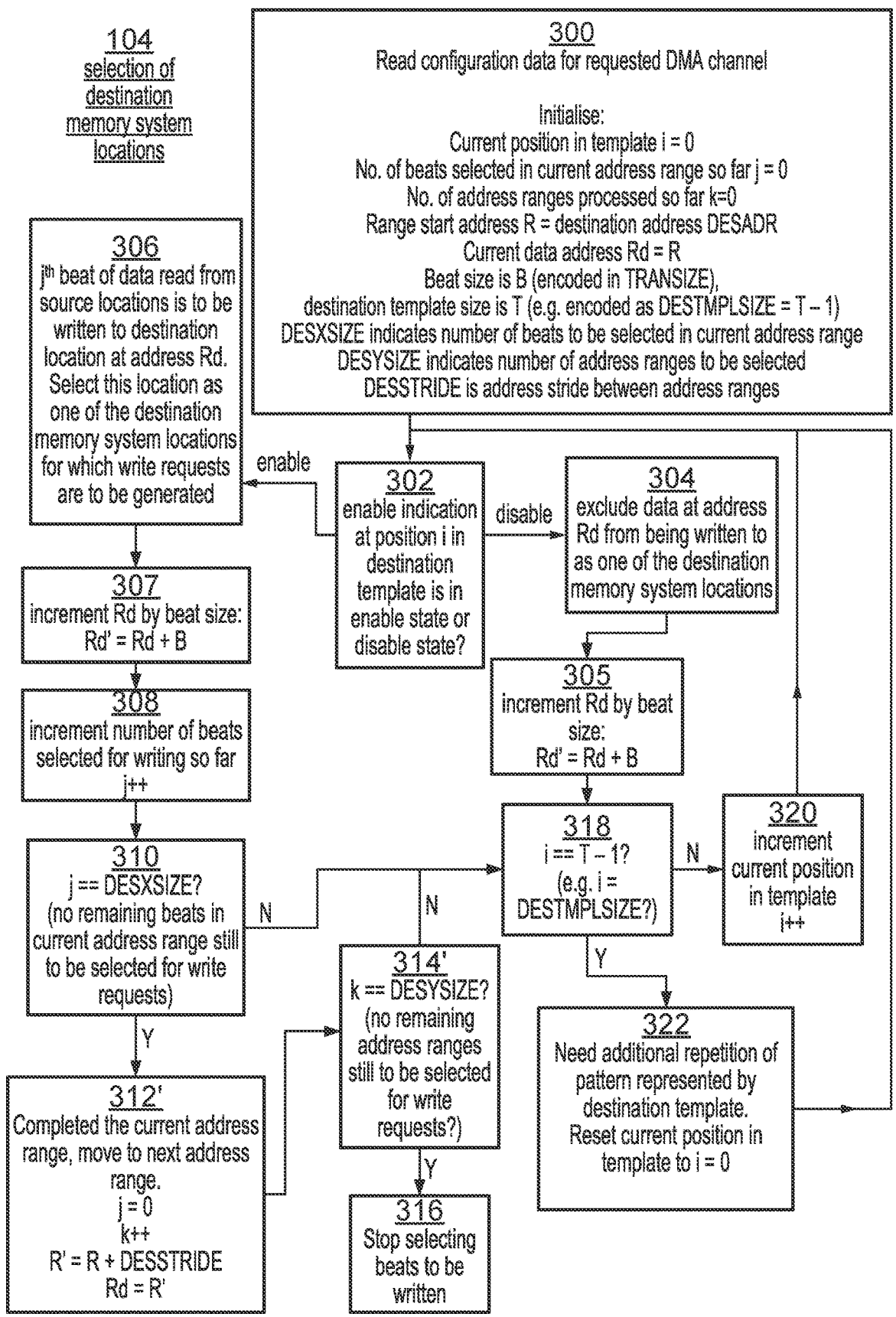

FIG. 13 schematically illustrates an example of a two-dimensional data structure stored in memory for which 2D template application can be useful;

FIG. 14 illustrates an example of the 2D application of the template;

FIG. 15 is a flow diagram illustrating selection of source memory system locations in a first example of 2D template application;

FIG. 16 is a flow diagram illustrating selection of destination memory system locations in a first example of 2D template application;

FIG. 17 shows a second example of 2D application of a DMA template, where the pattern indicated by the template can be applied across a boundary between one line of the 2D structure and another;

FIG. 18 is a flow diagram illustrating selection of source memory system locations in a second example of 2D template application; and FIG. 19 is a flow diagram illustrating selection of destination memory system locations in a second example of 2D template application.

DETAILED DESCRIPTION

A DMA controller has a command interface to receive DMA commands and DMA control circuitry to generate DMA memory access requests to be issued to a memory system based on the DMA commands. For example, the DMA commands could be issued by a processor such as a central processing unit (CPU) or graphics processing unit (GPU), and the DMA commands may (directly or indirectly) specify configuration data which can be used by the DMA controller to determine what pattern of memory accesses to issue.

In typical DMA schemes, in cases where the access pattern is regular, it can be relatively straightforward for the DMA controller to be programmed to generate a series of memory access requests. For example, such regular patterns may include copying of data from a first contiguous block of memory addresses to a second contiguous block of memory addresses (with no gaps in the source and destination address ranges), or copying of data from/to a number of address ranges which are at constant stride intervals. With such regular patterns, the number of DMA commands issued by a processor to program the DMA controller to generate all the required accesses may be relatively small and so the overhead of configuring the DMA controllers to perform the transfer may be much less than the overhead if the processor has to perform each individual access itself.

However, with typical DMA schemes it can be relatively difficult for the DMA controller to efficiently perform movement of data with irregular patterns, such as when the addresses for which data is to be copied are sparsely located at non-constant intervals within a certain address range. In this case, the overhead of sending the DMA commands to the DMA controller to set up the individual transfers for each of the sparsely located regions of memory can be costly compared to the small amount of data moved in each transfer. It may not be appropriate to simply move the entire range of memory across which the sparsely located data is located, as there may be intervening data that should not be transferred and that could have different security attributes, for example. Therefore, in cases where the transfer has an irregular pattern, it may often be less costly from a performance point of view to simply initiate the transfers from the processor itself, rather than involving a DMA controller.

In the examples discussed below, the DMA controller has template storage circuitry to store at least one DMA template indicative of a DMA data access pattern. Each DMA template comprises a number of enable indications, with each enable indication settable to one of an enable state and a disable state. For example, in the enable state the enable indication may indicate a value of 1, and in the disable state the enable indication may indicate a value of 0, although other mappings are also possible.

In response to a DMA command associated with a source address, a destination address, a source DMA template and a destination DMA template, the DMA control circuitry generates a set of DMA memory access requests to copy data from a number of source memory system locations to a number of destination memory system locations. The source memory system locations are selected to have addresses which are offset relative to the source address by offset amounts that correspond to positions of enable indications set to the enable state within the source DMA template. Similarly, the destination memory system indications are selected to have addresses which are offset relative to the destination address by offset amounts corresponding to positions of enable indications set to the enable state within the destination DMA template. The memory system locations could be memory storage locations in a memory storage device, or could be locations associated with addresses mapped to a peripheral device, for example.

This approach allows a DMA controller to be configured to perform data transfers even when the desired access pattern is irregular or sparsely populated within a certain range of memory, since the enable indications within the source DMA template and destination DMA template can be set to indicate irregular patterns of discontiguously located data. This means the number of DMA commands required to configure the DMA controller can be reduced (as it is not necessary to treat each sparse contiguous portion of data being copied as a separate DMA stream), making it much more practical to offload such irregular patterns of memory access operations to the DMA controller rather than performing it on a processor. Hence, by supporting the use of DMA templates, it becomes feasible to use the DMA controller in situations which would not previously have been practical, freeing up extra bandwidth for other operations on the processor and therefore improving performance.

When using the DMA template feature, the DMA control circuitry may exclude, from the source memory system locations selected for the copying of data, a memory system location having an address which is offset relative to the source address by an offset amount corresponding to the position of an enable indication set to the disable state within the source DMA template. Similarly, enable indications set to the disable state within the destination DMA template correspond to offsets which are excluded from the set of destination memory system locations. This allows the DMA control circuitry to skip over certain addresses which should not be copied, to support irregular patterns of accesses.

In some instances, the DMA control circuitry may use a same DMA template as both the source DMA template and the destination DMA template. This may be useful if the access patterns are the same for both the source and destination address ranges. Some implementations of the DMA controller may restrict the DMA control circuitry to always use the same DMA template for both source and destination DMA templates, so that it may not be possible to have the destination DMA template differ from the source DMA template, although it is possible to vary the DMA template shared for use as both source and destination DMA template from one operation to another.

However, more flexibility may be provided if the DMA control circuitry is configured to support the destination DMA template being different to the source DMA template. This allows the DMA controller, when copying the data from the source memory system locations to the destination memory system locations, to rearrange the data into a different pattern, under control of the source and destination DMA templates where the positions of the enable indications set to the enable state in the source/destination templates control the respective patterns at the source and destination. For example, sparsely located data in the source range of addresses could be rearranged to be copied to contiguous addresses within the destination range of addresses, or vice versa.

The DMA control circuitry is configured to generate the set of DMA memory access requests to maintain an address ordering of the copied data, so that when the copied data includes a first beat of data copied from a source memory system location having a first address and a second beat of data copied from a source memory system location having a second address greater than the first address, the set of DMA memory access requests causes the second beat of data to be copied to a destination memory system location having a greater address than a destination memory system location to which the first beat of data is copied. Hence, when copying beats of data from the source memory system locations to the destination memory system locations, the beats of data that are copied may remain in the same order relative to each other. In examples where there is support for having a different destination DMA template to the source DMA template, then even though the relative order of the beats remains the same after the transfer, the transfer may result in the offset between the destination addresses of one beat and the next becoming different compared to the offsets between the source addresses of the corresponding beats of data. As the relative order in the beats remains the same this means that the source and destination DMA templates can be represented using a relatively simple set of enable indications each set to either an enable state or a disable state, rather than needing a more complex mapping table to map specific addresses across from the source region to the destination region. Compared to arbitrary address mapping tables, restricting the address ordering to remain the same helps to reduce the complexity of implementing the DMA templates and reduce the overhead of configuration of the DMA templates, so that it is faster for a processor, such as a CPU or a GPU, to configure the DMA controller to perform the required data transfers.

Each enable indication of the DMA template may correspond to a beat of data associated with a block of addresses of a certain size. Hence, the DMA command may cause the transfer of a variable number of beats of data from the source memory system locations to the destination memory system locations, where the selection of which beats of data are to be copied from the source memory system locations to the destination memory system locations depends on the positions of the enable indications of the source DMA template which are set to the enable state.

In some examples, each beat of data may be of a fixed size.

However, for other implementations of the DMA controller, the DMA command may be associated with a variable beat size and the copied data may comprise a number of beats of data each having the variable beat size. The offset amounts of the addresses of the source/destination memory system locations can be scaled based on the variable beat size. This means that the size of the block of data that corresponds to one enable indication within the source/destination DMA template can vary. This provides more flexibility to adapt to different formats of data structures in memory.

In some implementations, the DMA commands may be associated with a first source size parameter specifying a certain number of beats and a first destination size parameter specifying a certain number of beats. When a number of enable indications set to the enable state in the source DMA template is less than the number of beats indicated by the first source size parameter, the DMA control circuitry may repeat the data access pattern represented by the source DMA template. When a number of enable indications set to the enable state in the destination DMA template is less than the number of beats indicated by the first destination size parameter, the DMA control circuitry may repeat the data access pattern represented by the destination DMA template. This recognises that, while part of the desired access pattern for accessing some data structures may be irregular, there may nevertheless be a repetitive element to the desired pattern, so that there may be a number of instances of repeating the same irregular pattern across different ranges of addresses. To avoid needing to separate such streams of accesses into multiple commands or have an unnecessarily long template, it can be useful for the DMA controller to be able to repeat the pattern represented by the source or destination DMA template a number of times until the specified number of beats have been read or written. This increases the flexibility to deal with different data access patterns.

Sometimes, the number of beats indicated by the first source size parameter or the first destination size parameter may be a number other than an exact multiple of the number of enable indications set to the enable state in the corresponding one of the source and destination DMA templates. In that case, a repetition of the data access pattern represented by the source DMA template or the destination DMA template can be truncated. Which particular repetition is truncated may be a design choice for the platform implementation. However, in some cases it may be preferred for the truncated repetition to be the final repetition of the data access pattern.

It can be useful for the DMA command to be associated with a source template size parameter indicative of a variable size for the source DMA template. The DMA control circuitry may control repetition of the data access pattern represented by the source DMA template based on the source template size parameter. For example, the source template size parameter may control which portion of the register storing the source DMA template is an active portion containing patterns of enable/disable indications which are to be repeated across successive ranges of memory addresses. Enable indications outside the active portion indicated by the source template size parameter can be ignored. Viewed another way, the source template size parameter may be considered to specify the size of the block of memory addresses which acts as one unit of the repetition of the source DMA template pattern.

Similarly, the DMA command may be associated with a destination template size parameter indicative of a variable size of the destination DMA template, and the DMA control circuitry may control repetition of the data access pattern represented by the destination DMA template based on the destination template size parameter. Again, it is possible for the destination DMA template to be of the same size as the source DMA template, but greater flexibility can be achieved if there is support for the source and destination DMA templates to be of different sizes as defined by respective source and destination template size parameters. This can be useful for providing greater flexibility for rearrangement of data between the source and destination memory system locations.

In general, by supporting a variable size source/destination DMA template, this improves the flexibility with which the templates can be used to control accesses to data structures of different dimensions, allowing a unit of repetition which matches the periodicity within the data structure being accessed to be selected, even though within each of those units an irregular pattern of sparse accesses may be indicated by the source/destination template.

The source/destination DMA templates can be applied as a 1-dimensional (1D) template. When a source or destination DMA template is applied as a 1D template, the DMA control circuitry repeats the data access pattern represented by the source/destination DMA template until sufficient source/destination memory system locations have been selected to enable the number of beats indicated by the first source/destination size parameter to be read/written. Hence, for 1D template application the first source/destination size parameter provides an indication of the total number of beats to be transferred.

For 1D template application, the first source size parameter and the first destination size parameter may indicate the same number of beats and may be indicated through a common parameter maintained by the DMA controller. Hence, the number of beats to be read/written before accesses are terminated may be the same for both the source and destination ranges (since it may be assumed that each of the beats read from the source memory system locations is to be written to a corresponding destination system memory locations).

However, it is also possible for the source/destination DMA template to be applied as a two-dimensional (2D) template. When the source/destination DMA template is applied as a 2D template, then within each of two or more non-consecutive source/destination ranges of addresses separated at intervals of a source/destination stride value associated with the DMA command, the DMA control circuitry may repeat the data access pattern represented by the source/destination DMA template. In this case, the first source/destination size parameter (e.g. the source or destination XSIZE parameter mentioned in subsequent examples) indicates the number of beats to be read/written in a given one of the non-consecutive ranges of source/destination addresses. The DMA command is also associated with a second source/destination size parameter (e.g. the source or destination YSIZE parameter mentioned in subsequent examples) which specifies how many source/destination ranges are in the plurality of non-consecutive source/destination ranges. This approach is useful for controlling DMA transfers relating to a tile of data within a 2D data structure such as a table or matrix, where there may be gaps between the lines of the tile to be processed.

Some examples may have separate control parameters defining the first source size parameter and the first destination size parameter, and separate control parameters defining the second source size parameter and the second destination size parameter. However, it is also possible for the first source size parameter and first destination size parameter (e.g. XSIZE) to be specified through a common parameter so that they are constrained to be equal, and for the second source size parameter and the second destination size parameter (e.g. YSIZE) to be specified through a common parameter (different from the parameter representing the first source size parameter and the first destination size parameter) so that they are constrained to be equal. Hence, there are varying approaches that can be taken to provide more or less flexibility in the DMA configuration options.

For 2D template application, it can be useful to specify the first and second source size parameters separate from the first and second destination parameters, as this can be used to implement a rearrangement of the data so as to change the dimensions of the portion of the 2D data structure between the source and destination address ranges.

When the data access pattern represented by the source/destination DMA template is repeated across the non-consecutive source/destination ranges in a 2D template application, different approaches for controlling the repetition of the template across multiple source/destination ranges can be taken in cases where the number of beats of data indicated by the first source/destination size parameter is not an exact multiple of the number of enable indications set to the enable state in the source/destination DMA template. In one example, when moving to the next source/destination range, the DMA access pattern may restart at the beginning of the source/destination DMA template, so that each non-consecutive source/destination range has a consistent pattern of accesses (but irregular pattern within a given range), with the first enable indication of the template being used to control whether to transfer the beat of data at the start address of each non-consecutive source/destination range. Alternatively, template application may not restart when moving to the next non-consecutive source/destination range, so that it is possible for one instance of the template to be applied across the end of one source/destination range and the start of the next source/destination range. This could be useful in cases where the desired access pattern is not the same for each line of the data structure being accessed, so that a template which wraps around over multiple lines may be used.

Some implementations of the DMA controller may only support the 1D template application of a source DMA template or a destination DMA template. Even if accesses to a 2D structure in memory are desired, 1D template application could still support such accesses by issuing separate DMA commands each applying a template in a 1D manner to an individual line of the 2D data structure to be accessed.

However, other implementations of the DMA controller can support 2D applications of DMA templates, and if so this may further reduce the number of DMA commands required for copying data associated with 2D structures in memory such as matrices or tables, where there may be some non-consecutive ranges of addresses (for example representing different rows or columns of a table) which need to be accessed. Hence, support for 2D template applications may further reduce the number of DMA commands needed and hence reduce the overhead from the point of view of the processor which configures the DMA controller.

Note that the DMA template itself can be exactly the same regardless of whether it is being applied as a 1D template or a 2D template. Which approach is used may depend on parameters of the DMA command, such as whether the second source/destination size parameter or the source/destination stride values have been configured to indicate a 2D template application.

The source/destination DMA template can be associated with DMA commands in different ways. In some cases, the DMA command could directly specify the source/destination DMA templates, such as by including a bitmap providing the enable indications as part of the payload of the command itself.

However, in one example the template storage circuitry may store DMA templates for multiple channels of DMA transfer, and the DMA command may specify a channel indication identifying the channel of DMA transfer for which data transfers are to be started by the DMA controller. In response to the DMA command, the DMA control circuitry may select, from the template storage circuitry, the source DMA template and the destination DMA template that are associated with the channel indication specified by the DMA command. Hence, it is not essential for the DMA command to specify the templates directly, as the templates could already have been preconfigured for a given channel indication within the template storage circuitry at the point when the DMA command for initiating the data transfers is issued. For example, the channel indication could be a memory address that is mapped for the corresponding channel, or could be a channel number specified in the DMA command.

The command interface may be responsive to receipt of a template configuration command to update at least one DMA template stored in the template storage circuitry. Hence, the DMA templates can be programmed by issuing template configuration commands to the command interface.

The DMA controller may in some instances be viewed as a product in its own right, independent of the rest of the memory system and the processor with which it may be used in a system on chip. For example, DMA controller designs may be licensed independently of the designs of other parts of a data processing system with which the DMA controller can subsequently be integrated.

However, the DMA controller can also be provided as part of a system which, in addition to the DMA controller, also includes processing circuitry to execute program instructions according to an instruction set architecture. The processing circuitry (e.g. a CPU or GPU) may issue the DMA commands which are received by the command interface of the DMA controller. For example, the DMA commands may be memory-mapped commands, so that certain addresses or ranges of addresses may be allocated for DMA configuration purposes in the address space used by the processing circuitry, so that when the processing circuitry issues a write request to write data to an address in one of the allocated ranges, then this is interpreted as a DMA command to be sent to the command interface of the DMA controller, with the write data associated with the write request representing the command payload and the encoding of that payload indicating what is represented by the command (e.g. identifying whether the command is a DMA template configuration command, another type of configuration command for setting other parameters of the DMA configuration data for a given channel of DMA transfer, or a DMA start command requesting that the DMA transfers for a specified channel of DMA transfer are to be initiated).

Figure 1:
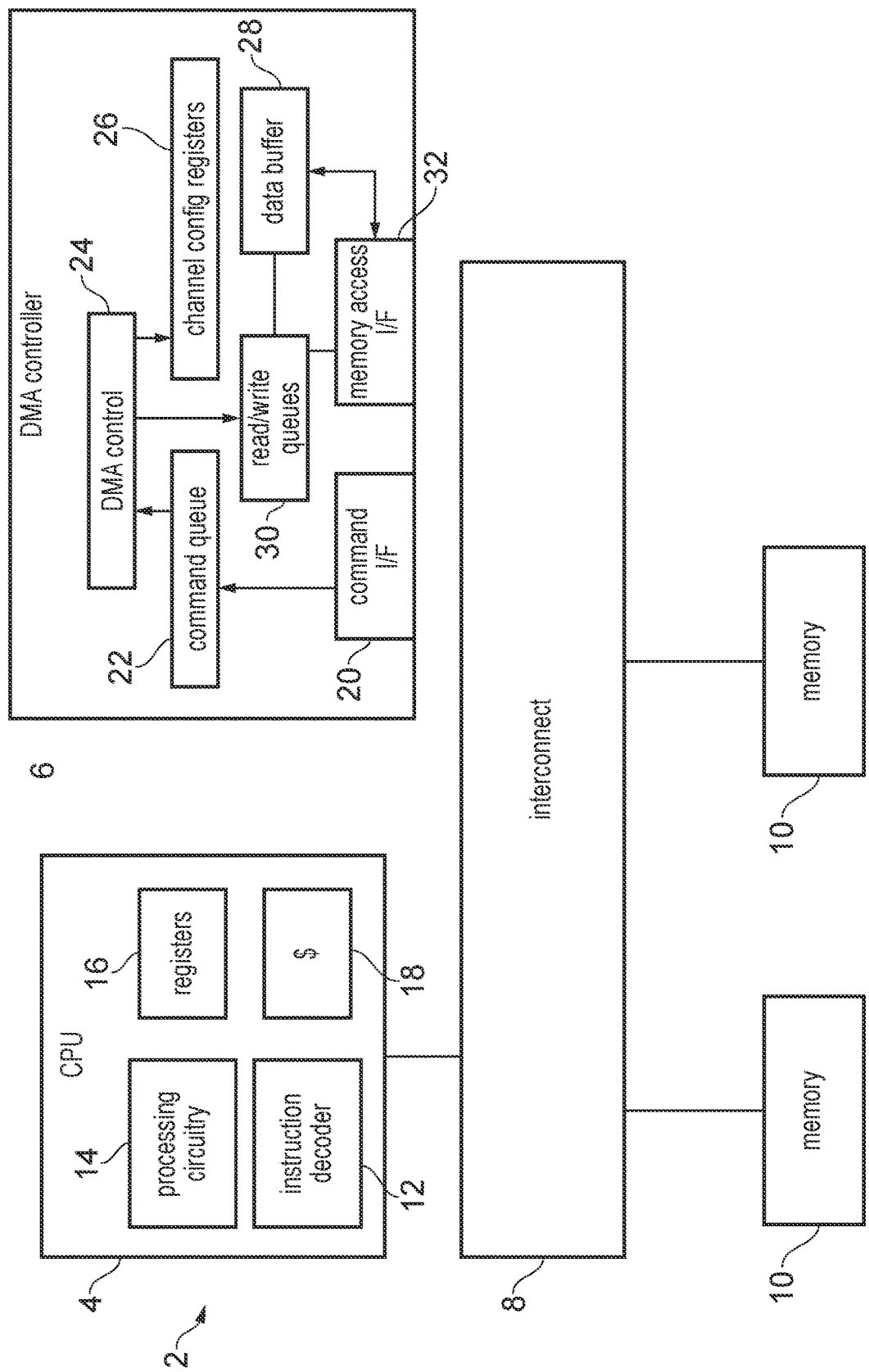

FIG. 1 schematically illustrates an example of a data processing system 2, having a processor (in this example a CPU) 4 and a DMA controller 6 which are coupled by an interconnect 8 to share access to shared memory 10. It will be appreciated that, although not shown in FIG. 1, the system 2 may also have other components such as additional processors, such as one or more further CPUs 4, or a graphics processing unit (GPU), or other devices capable of initiating memory accesses, such as display controllers, peripheral controllers, network controllers etc. The system 2 may also have other components capable of receiving access requests like SPI (Serial Peripheral Interface) controllers, GPIO (General Purpose Input Output) interface controllers, and UARTs (Universal Asynchronous Receiver and Transmitter). The DMA controller 6 can be capable of memory-to-memory data transfers, peripheral-to-memory data transfers and memory-to-peripheral transfers. The interconnect 8 routes memory access requests and responses across the system 2.

The CPU 4 is capable of executing program instructions defined according to an instruction set architecture, to perform data processing operations represented by the instructions. The CPU has an instruction decoder 12 to decode the program instructions fetched from one or more caches 18 or from memory 10. Processing circuitry 14 executes the decoded instructions to perform the corresponding data processing operations. Registers 16 are provided to store operands for the executed instructions and results of executed instructions are written back to the registers 16. The caches 18 (which could include a hierarchy of multiple cache levels) cache instructions to be fetched for decoding by the decoder 12 and data for access by the processing circuitry 14. The cached instructions/data are a subset of the instructions/data stored in the memory system 10. The caches 18 provide faster access to this subset of instructions/data than if it had to be accessed from memory 10.

The DMA controller 6 is provided to enable data transfer operations for moving data from one range of memory addresses to another to be offloaded by the CPU 4 to the DMA controller 6 to free up processor time for other operations (e.g. arithmetic/logical operations). The DMA controller 6 has a command interface 20 via which DMA commands issued by the CPU 4 or read from memory are received by the DMA controller 6. The DMA commands are issued by writing command data to memory mapped registers channel configuration registers 26 or requesting loading of command data from memory to those registers 26. A command queue 22 can be used to queue pending command data while awaiting a register update. Hence, part of the address space accessible to the CPU 4 is allocated for the DMA control registers, so that when the processing circuitry 14 executes at least one store operation to request that data is stored to a target address mapped to the region(s) allocated to the DMA control registers, then this is interpreted as at least part of a DMA command and the store data associated with the store request is routed via the interconnect 8 to the command interface 20 and placed within a command queue 22 (or written directly to the control registers 26). The encoding of the store data identifies the type of command and/or identifies parameters associated with the command. A DMA command could be represented by either a single register write, or a set of multiple register writes.

The DMA controller has DMA control circuitry 24 for controlling the generation of DMA memory access requests to be issued by the DMA controller 6 to the memory system 8, 10. A set of channel configuration registers 26 are provided to store channel configuration data for one or more channels of DMA data transfer. The configuration data in the channel configuration registers 26 can be updated by the DMA control circuitry 24 in response to the DMA commands received via the command interface 20 from the CPU 4. For example, some of the writes representing a DMA command received over the interface 20 may request that the configuration data for a specified channel number is updated. Other writes representing a DMA command may request that data transfer starts for a particular DMA channel number, and when such a request is received then the DMA control circuitry 24 may start generating a series of memory access requests based on the channel configuration data stored in the registers 26 for the corresponding channel. The DMA memory access requests generated by the DMA control circuitry 24 may include read requests to read data from memory 10 into an internal data buffer 28 of the DMA controller 6, and write requests to write data from the data buffer 28 to memory. The DMA memory access requests generated by the DMA control circuitry 24 are queued in read/write queues 30 of the DMA controller 6 while awaiting bandwidth to become available for issuing the requests to the memory system. Hence, the read queue may queue information defining pending read operations to be issued by the DMA controller 6. For example, the read queue may store the target addresses and other identifying information associated with read requests awaiting issue. Similarly, the write requests in the write queue may be identified by their address and other parameters. When there is sufficient bandwidth available to issue a queued read or write operation to the memory system via a memory access interface 32, the read or write request is sent out over the interface and, for a read request, the memory system responds by returning the target data associated with the specified address to the memory access interface 32, from which the read data is placed in the data buffer 28. For a write request, data from the data buffer 28 is transferred as write data over the memory access interface 32 to be written to memory. Once all the required read/write requests for a given channel of DMA data transfer have completed, the DMA controller 6 may issue a confirmation to the CPU 4 that requested the DMA transfer to confirm that the channel of DMA transfers is complete.

The command interface 20 and the memory access interface 32 may communicate with the interconnect 8 according to the interconnect communication protocol implemented by the interconnect 8 for memory access requests and responses. The command interface may act as a subordinate interface (previously referred to as a slave interface) according to the interconnect protocol and the memory access interface 32 may act as a manager interface (previously referred to as a master interface).

Hence, the DMA controller 6 is a hardware module that enables data transfer duties to be offloaded from the CPU 4, saving expensive CPU cycles for data processing instead of data moving. However, typical DMA controllers are generally intended to be used for bulk data transfer with a well-defined periodicity, such as a one-dimensional transfer of continuous bulk data from a relatively large contiguous range of addresses, or continuous bulk data with periodic address gaps in a two-dimensional transfer with a regular stride pattern. For such cases where the data access pattern is regular, the overhead of the CPU 4 setting up the DMA transfers by issuing commands over the command interface 20 may be small in comparison to the amount of data moved during the DMA transfer so that it is efficient to offload the transfer duties to the DMA controller 6.

However, there are other access patterns when typical DMA controllers 6 are inefficient to use, such as when configuration data is to be copied to memory-mapped registers within a device coupled to the memory system (e.g. the device could be a hardware accelerator, a network interface controller, a display controller or peripheral controller, for example). When updating values in memory-mapped registers, the particular registers to be updated may be at addresses which are sparsely located within a certain memory range, and it may not be appropriate to copy data into the entire continuous range spanned by the registers to be updated because there may be other data or registers with differing functional or security settings in the intervening portions of the address range not to be updated. With typical DMA controllers 6, such an access pattern would require the updates to be broken into a number of separately configured DMA channels each restricted to the portion of the required data transfers that can be mapped to a regular access pattern. When the length of any individual DMA transfer operation broken down in this way is very short then the overhead of CPU 4 issuing the memory-mapped commands to configure the DMA operations may be greater than the overhead that the CPU 4 would have expended it if had simply issued the required memory access requests itself, making it difficult to offload such duties onto a DMA controller 6.

In the examples discussed below, DMA templates are provided which allow individual entries at irregular patterns within a certain memory range to be selected using a single DMA command, based on template masks for both source and destination memory regions. This means that during execution of a DMA command, only the selected memory addresses need to be read or written so that they can be copied from one region to another without copying all the intervening locations, even if there is an irregular stride pattern between the locations to be copied. This makes it much more feasible to offload data transfer operations to the DMA controller 6 even when data access patterns are irregular, such as in the use case of copying configuration data into memory-mapped registers of a device. Another example of a use cases where the template feature can be useful is if there are a number of channels of interleaved data stored in memory and certain selected channels need to be extracted and copied to a different region of memory, but the positions of the required channels are not at a regular stride offset compared to each other (e.g. if channels 1, 2, 7, 14 of 16 interleaved channels of data need to be extracted). It will be appreciated that users will find other use cases for the DMA template feature, so these are just two examples.

Figure 2:
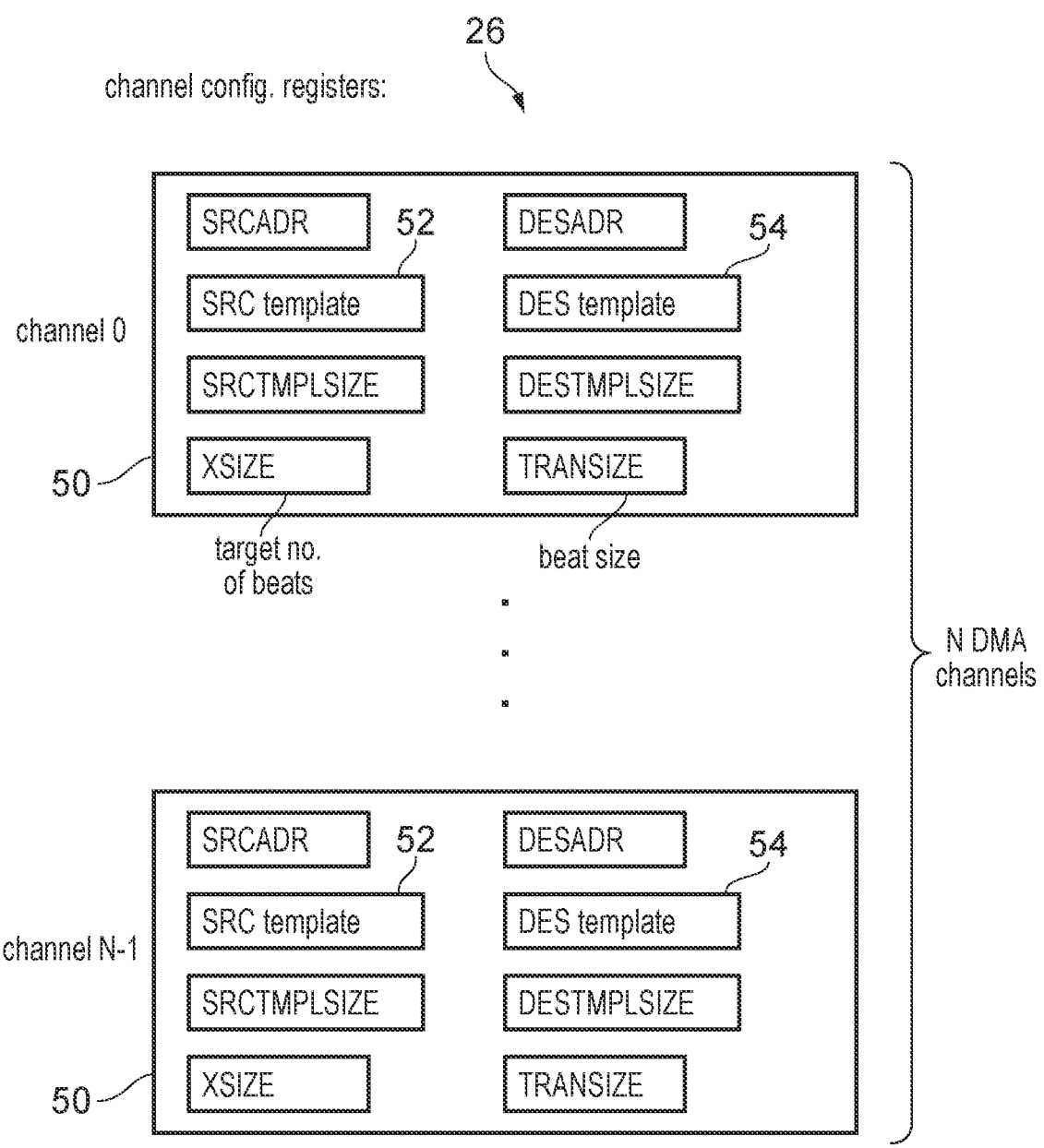
FIG. 2 shows an example of DMA channel configuration data used by the DMA controller, including support for DMA templates.

FIG. 2 shows a first example of channel configuration information that can be provided in the channel configuration registers 26 to support use of the template feature. The channel configuration registers 26 store a number of sets 50 of channel configuration data for a certain number, N, of DMA channels. For each channel, the set of configuration data 50 provided is configurable by the CPU 4 issuing one or more channel configuration commands to the command interface 20 specifying an identification of the corresponding channel (e.g. by specifying a channel number, or in an implementation where each set of configuration data 50 is allocated a separate set of memory mapped addresses, by distinguishing which channel is specified using the target address of a store request issued to trigger the register update, operation). After the configuration data for a given channel has been configured, the CPU 4 issues a DMA start command identifying the corresponding channel (again, through a channel number or by specifying a memory mapped address corresponding to that channel), and in response the DMA control circuitry 24 can start issuing read or write request for the corresponding channel based on the configuration data set in the channel configuration registers 26 for that channel.

Each set 50 of channel configuration data includes a number of parameters, which in this example include the following:

Source address SRCADR: the source address representing the start of a source region of memory from which data can be read by the DMA controller 6 for copying to the destination region (note that, depending on the values set for the source DMA template, the data at the source address itself may or may not itself be read);

Destination address DESADR: the destination address representing the start of a destination region of memory address space to which the data read from the source region can be written (note that, depending on the values set for the destination DMA template, the data at the source address itself may or may not itself be read);

Source DMA template 52, which is a mask providing a number of enable indications which indicate the address offsets, relative to the source address, from which data is to be read from the source memory region for copying to the destination region;

Destination DMA template 54, which is a mask comprising a number of enable indication which indicate the address offsets, relative to the destination address, to which the data read from the source memory region is to be written;

Source template size SRCTMPLSIZE, which defines the size of an active portion of the source template 52, for controlling repetition of the pattern represented by the template;

Destination template size DESTMPLSIZE, which defines the size of an active portion of the destination template 54, for controlling repetition of the pattern identified by the template;

Target number of beats XSIZE, which indicates the total number of beats to be copied from the source memory region to the destination memory region (in this example, the channel configuration data supports applying the source and destination DMA templates as a 1D template, and the target number of beats XSIZE acts as both the first source size parameter and the first destination size parameter mentioned earlier);

Transaction size TRANSIZE, which indicates the beat size of an individual beat of data which corresponds to one mask indication within the source or destination DMA templates. For example, the transaction size could be indicated as being 1 byte, 2 bytes, 4 bytes, etc. This enables the template feature to scale to different sizes of data structures within memory.

Figure 3:
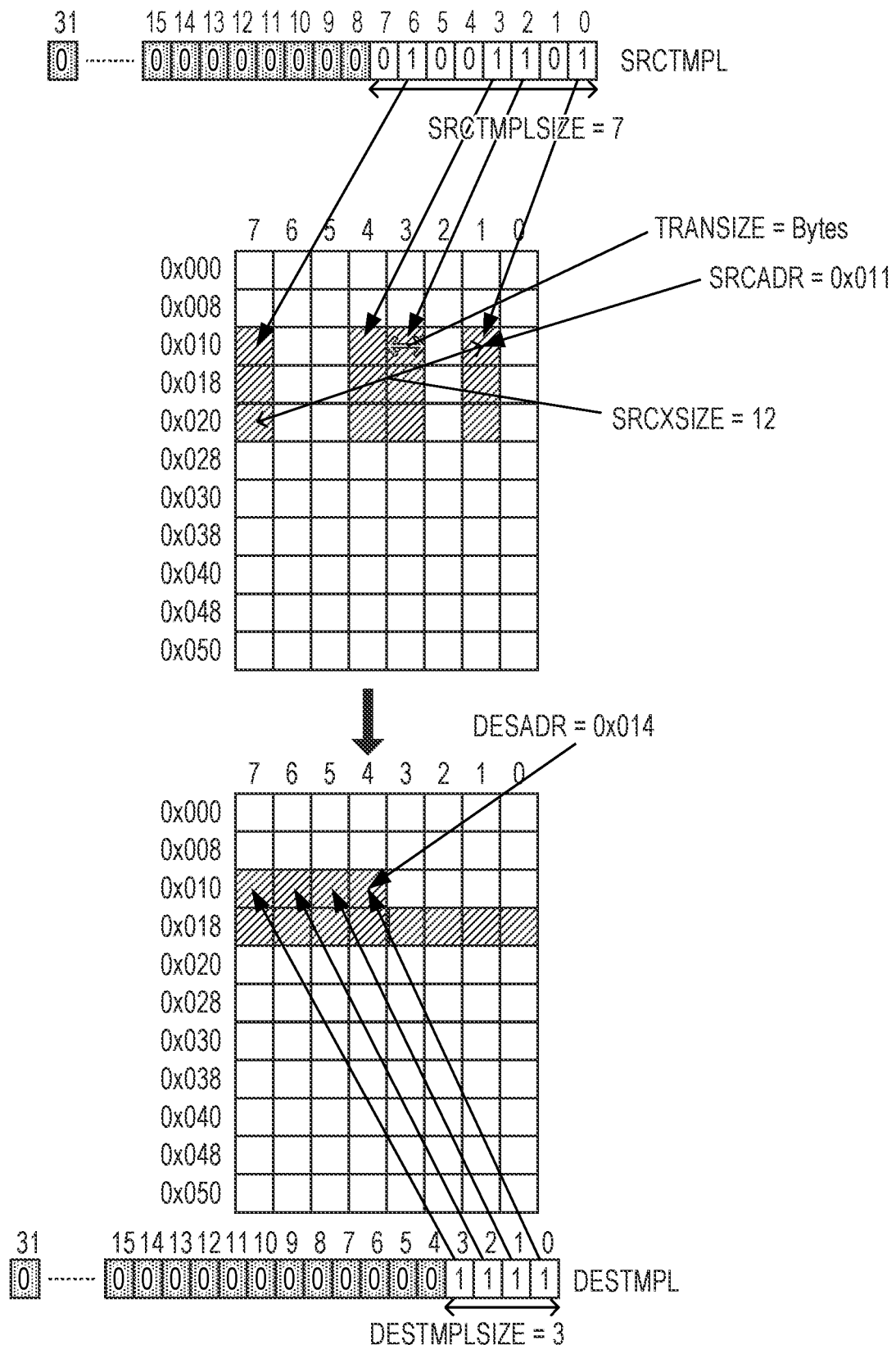
FIG. 3 shows an example of using source and destination DMA templates for controlling patterns of DMA transfer.

FIG. 3 shows an example of using the source and destination templates 52, 54 to control a DMA transfer with an irregular access pattern, with different arrangements for the source and destination data. Note that, in this example, for conciseness only the lower 3 hex digits of the source/destination addresses are shown, and although not shown, the more significant hex digits of the source/destination addresses could be different to each other so that the source and destination memory regions do not overlap.

The source and destination templates each include a set of enable indications each settable to either an enable state (in this example indicated by a bit value of 1) or to a disable state (in this example indicated by a bit value of 0). In this example, the source and destination templates are stored in a register supporting a maximum template size of 32 bits. The source and destination template size parameters SRCTMPLSIZE, DESTMPLSIZE indicate the size of the active region of the source and destination templates 52, 54 respectively, so that the template size can vary to be smaller than the maximum size supported, if desired. In this example, the source and the destination template size values are encoded to indicate the position of the last enable indication within the active portion (in this example, bit 7 for the source template and bit 3 for the destination template). In other words, the source and destination template size values may be encoded as the total number of enable indications within the active portion minus 1 (in other words, the actual template size is the value of the size parameter plus 1). It will be appreciated that other encodings could also be used.

In this example, the transaction size is set to indicate byte granularity of access, and so each bit in the source and destination templates corresponds to 1 byte of data. The target number of beats XSIZE in this example is set to 12, to indicate that 12 bytes of data are to be copied from a source region of memory to a destination region of memory.

For a first instance of applying the source template to the source memory region, the positions of the enable indication set to the enable state (1) within the source template 52 indicate the offsets of the addresses of data to be copied relative to the source address (with those offsets being scaled based on the transaction size, so that in this example the offsets are byte offsets). Hence, for this particular example the enable bits set to 1 in the source DMA template 52 are at locations 0, 2, 3, 6 of the source template 52 and so adding the corresponding byte offsets to the source address 0x011 in this example gives addresses 0x011, 0x013, 0x014 and 0x017 for which data is to be read from the source memory region. The intervening memory locations corresponding to enable indications in the disable state within the source template 52 are skipped, so that no data is read from the memory system locations at the addresses 0x012, 0x015 and 0x016 which correspond to the zeros at positions 1, 4, 5 within the source template mask 52.

As the active portion of the source template 52 only includes 4 enable bits set to the enable state and the required number of beats to be transferred is 12 then two further repetitions of the source template are needed to allow the required number of beats of data to be copied. The unit of repetition of the pattern shown in the template corresponds to the source template size, so in this case as the source template size is 8 and the beat size is 1 byte then each instance of applying the template starts at an address 8 bytes further on from the previous instance. Hence, the set of source addresses of bytes to be copied is 0x011, 0x013, 0x014, 0x017 (for the first repetition of the template), 0x19, 0x1A, 0x1B, 0x1F (for the second repetition of the template) and 0x21, 0x23, 0x24, 0x27 (for the final repetition of the template), giving 12 bytes of copied data in total.

For the destination template in this example, the size of the active portion is 4 and all the bits within the active portion are set to 1, indicating that 4 beats of data are to be written to consecutive bytes starting from the destination address 0x014. As the size of the active portion is 4 and beat size is 1 byte, the unit of repetition of the pattern represented by the destination template is 4 bytes so that each instance of repeating the pattern starts 4 bytes further on from the previous instance. Hence, in this case the 12 bytes of data read from the source locations are written to 12 consecutive bytes of memory as indicated in FIG. 3, from addresses 0x014 to 0x01F.

Hence, the source and destination templates can be used to rearrange the structure of the data stored in memory based on changing the pattern of enable and disable states indicated for the enable indications within the source or destination mask respectively. While the data was sparsely located in irregular patterns in the source memory regions, the data is copied to a contiguous region of the destination memory region in this example. However, other examples could also have irregular patterns of access for the destination memory region.

Note that the order of the copied beats of data remains the same following the transfer. That is, for any two given beats of data that are being copied, where a first beat has a lower source address and a second beat has a higher source address, the first beat will still have the lower destination address and the second beat have the higher destination address after the transfer, although the interval between the destination addresses of the first and second beats may have changed compared to the interval between the source addresses of the first and second beats. For example, in FIG. 3, the beat at addresses 0x011, 0x013, 0x014, 0x017 are copied to destination addresses 0x14, 0x15, 0x16, 0x17 respectively, but stay in the same order. This simplifies the template configuration because it means that a simple bitmap of enable/disable indications is sufficient to represent the access pattern, rather than needing a more complex address mapping table which would be the case if reordering of the data were to be supported.

Figure 4:
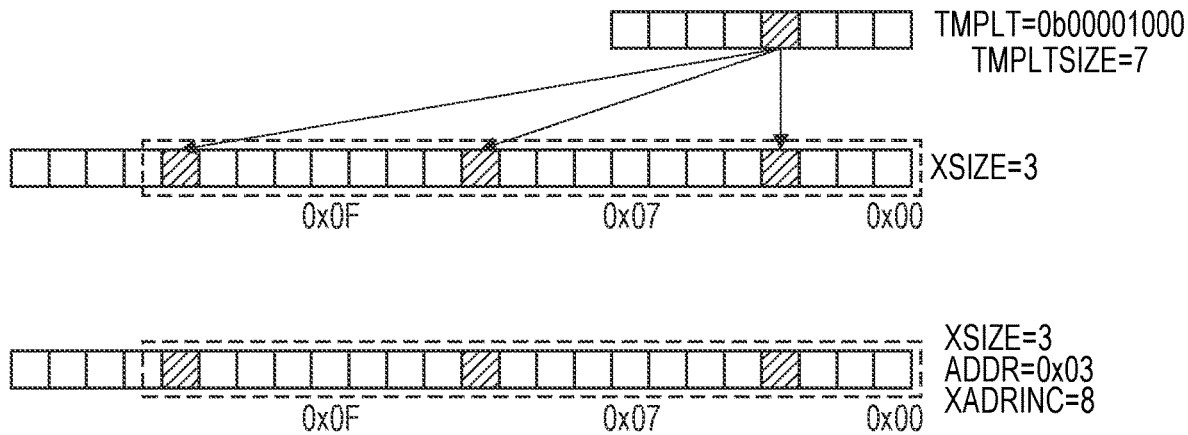
FIGS. 4 to 7 show further examples of applying a DMA template.

FIGS. 4 to 7 illustrate further examples of use of the template. FIG. 4 shows an example where a source or destination template has a template size greater than 1 (i.e. the template size parameter in the encoding mentioned above is greater than 0), but only a single enable indication within the template is set to the enable state. This results in an access pattern which is a strided access in one dimension with a regular stride offset between the locations that are read from a source memory region or written to a destination memory region. The maximum increments for the stride would be restricted to the size of the template register (e.g. 32 in this example) as a maximum. It will be appreciated that such a regular stride pattern of access may already be supported by the DMA controller 6 using other channel configuration data (e.g. as shown in the lower part of FIG. 4, the DMA controller may already support a different format of configuration data which specifies the transfer size XSIZE indicating the number of bytes to be transferred, the source address from which the transfer pattern is to be started, and a stride value XADRINC indicating the stride offset between the transferred bytes). Hence, the example of FIG. 4 shows that the DMA template feature has flexibility to replicate features that may be available through other configuration options as well, so as to provide a unified configuration mechanism which not only can support those strided accesses but could also support irregular patterns as shown in FIG. 3. Hence, those other configuration options could in some cases be omitted, although for backwards compatibility reasons it may be preferred to keep them even if the DMA template can also provide the same access pattern.

Figure 5:
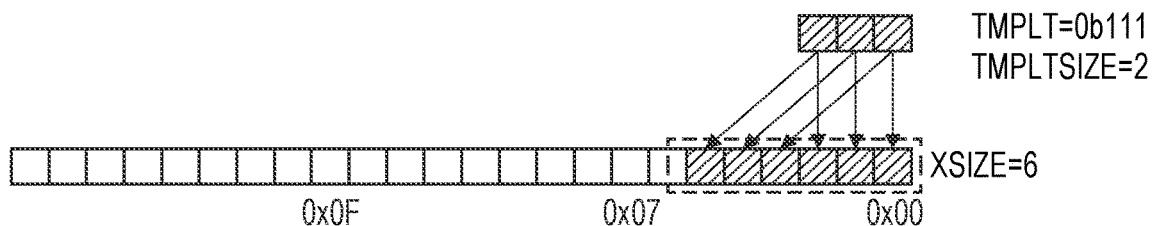

As shown in FIG. 5, in a similar way the template feature can also be used to replicate a contiguous read or write to a certain block of memory without any locations being skipped, if the template is defined to have a certain size but with all the template bits in the active region being set to the enable state.

Figure 6:
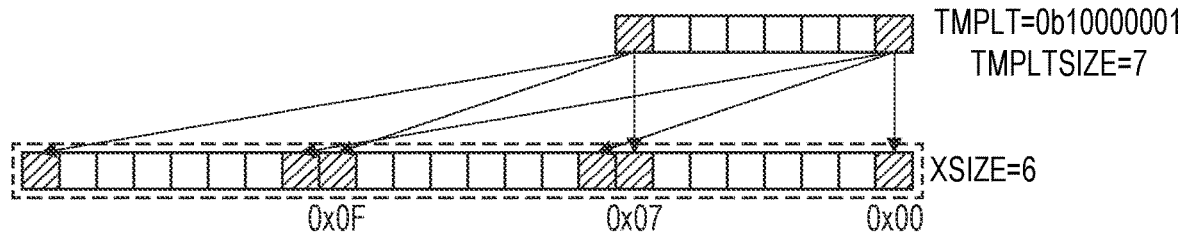

FIG. 6 shows an example of a pattern which would be harder to implement using conventional techniques, but is possible using the DMA templates. In this example the upper and lower enable indications of the source/destination template are set to the enable state and all intervening bits are set to the disable state, which with a template size of 8 (i.e. a template size parameter of 7 in the encoding discussed above) which with 1 byte beat size would mean that the reads and writes are to address offsets relative to the source/destination address of 0x00, 0x07, 0x08, 0x0F, 0x10 and 0x17. However, by varying the beat size indicated by the TRANSIZE parameter, the same template can be applied in a different pattern. For example, with word beats (4 byte beat size), applying the template shown in FIG. 6 as a source DMA template would cause beats of 4 bytes each to be read from 0x00, 0x7C, 0x80, 0xFC, 0x100, 0x17C (relative to the source address). Note that, with a 32-bit template at the maximum size, this approach allows a maximum of 30 empty beat wide gaps to be provided as a maximum. Of course, other implementations may implement a different maximum template size, e.g. 16 or 64 bits.

Figure 7:
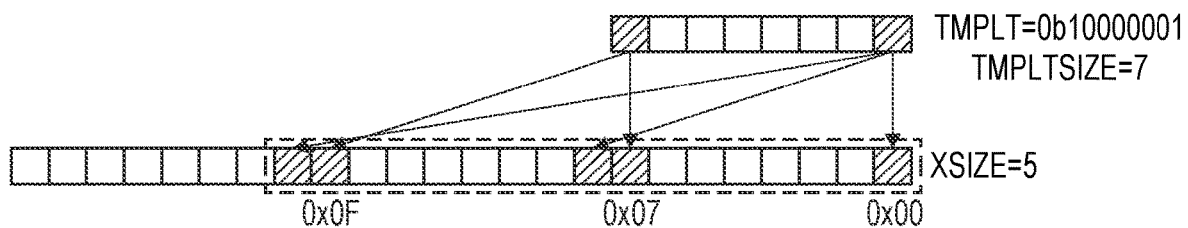

The template size for the source or destination template can be defined to be either greater, equal or smaller than the number of transfers indicated in the XSIZE parameter, but it is the number of ones in the template mask together with the XSIZE parameter that define how many transfers will be sent—the number of beats to be transferred is independent of the template size. The template size controls the repetition of the pattern represented by the template, but not the overall number of templates. If the number of enable indications in the enable state in the active part of the template is smaller than XSIZE, then the pattern is repeated, but the transfer will stop when the number of beats of data transferred reaches XSIZE, even if there are still some enable indications remaining in the enable state for the last repetition of the template. Hence, one of the repetitions of the template can be truncated when the number of ones in the pattern is not an integer devisor of the target number of beats. For example, as shown in FIG. 7, if the number of enable indications set to the enable state in the active part of the template mask is 2 but the target number of beats is 5, then there are two instances of fully applying the template and then one truncated repetition of the template where only the first transfer indicated by the first bit of the template is performed but the transfer is halted before reaching the offset represented by the second bit set to the enable state.

Hence, it will be appreciated that the use of the template mask provides significant flexibility in defining the data access patterns which may differ for source and destination regions to permit a variety of data rearrangements to be supported.

Figure 8:
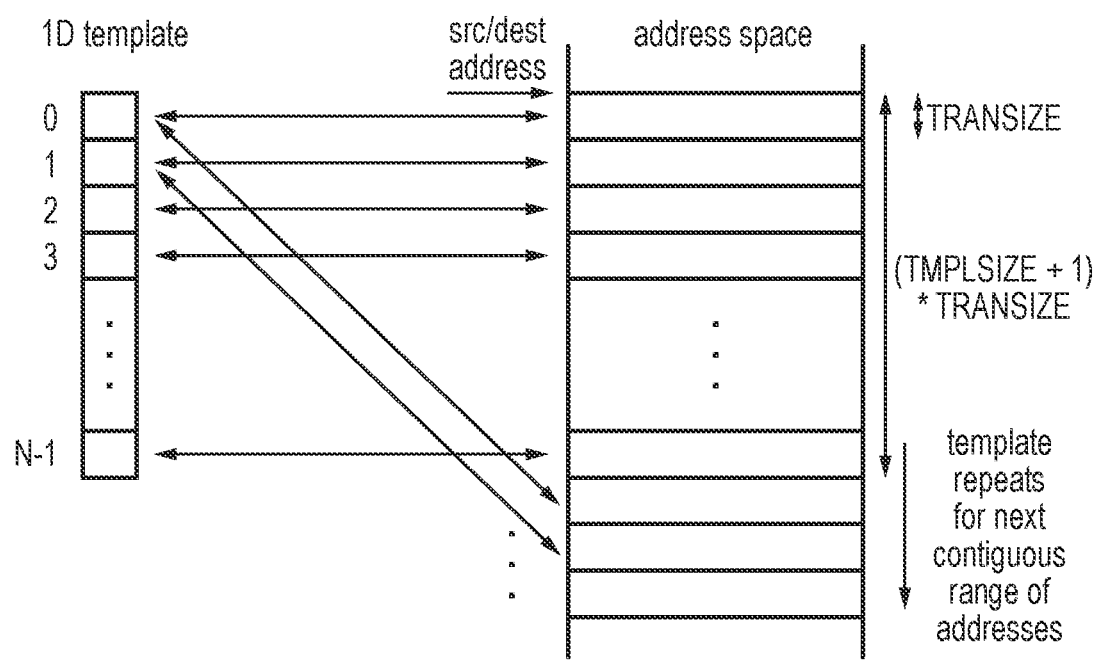
FIG. 8 shows a one-dimensional (1D) application of a DMA template.

FIG. 8 schematically illustrates how the enable indications of a template applied in a 1D DMA transfer map to the corresponding addresses of locations in the source or destination memory region. The source/destination address for the current channel of DMA transfer represents the start of the source/destination memory region for which data is to be copied. The enable indication at position 0 within the DMA template corresponds to the address at that source or destination address and then each successive enable indication in the remaining part of the active region of the template corresponds to a subsequent beat of data at addresses which follow the source/destination address, with the beat size of the data corresponding to one enable indication determined based on the transaction size parameter TRANSIZE If the required number of beats to be transferred is greater than the number of enable bits set to the enable state within the mask then a further repetition of the template is applied, and the start of the next application of the template is at an address which is incremented relative to the source or destination address by an offset corresponding to the product of the effective template size (e.g. TMPLSIZE+1) and the beat size indicated by the TRANSIZE Hence, the template is repeated across a number of contiguous ranges of addresses with no gaps between the ranges, when the template is applied as a 1D template.

Figure 9:
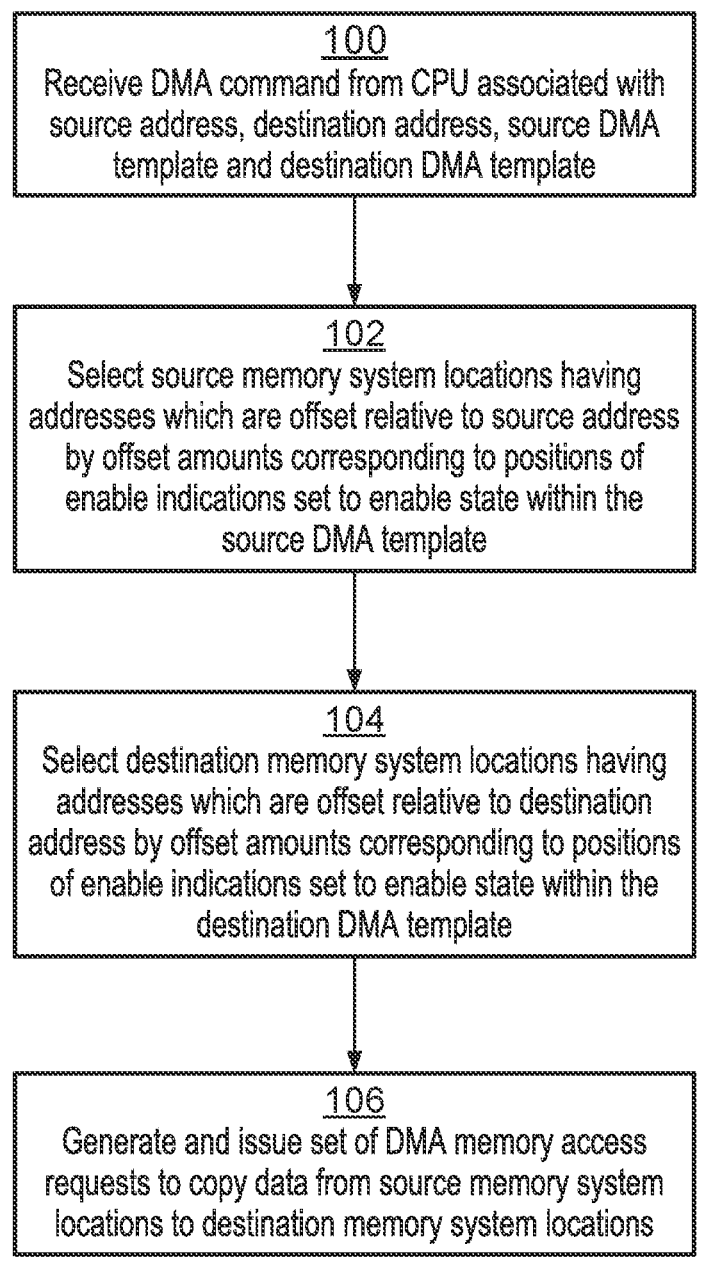
FIG. 9 is a flow diagram illustrating a method of controlling direct memory access.

FIG. 9 is a flow diagram illustrating a method of controlling DMA transfers. At step 100, a DMA command is received at the command interface 20 of the DMA controller 6, having been issued by the CPU 4. The DMA command is associated with a source address, a destination address, a source DMA template and a destination DMA template. For example, the association between the DMA command and the parameters of the command could be by the DMA command specifying a channel number and the parameters for that channel number having previously been configured with the channel configuration registers 26. Alternatively, it may be possible for the DMA command to specify some of its parameters directly in the same command payload that specifies the command itself (the command that triggers the start of the DMA transfers). The DMA controller may support the source and destination DMA templates being the same in some instances, although greater flexibility can be supported by enabling different DMA templates to be provided as the source and destination DMA templates.

At step 102, in response to the DMA command, the DMA control circuitry 24 selects source memory system locations which have addresses which are offset relative to the source address by offset amounts which correspond to the positions of the enable indications set to the enable state within the source DMA template. Similarly, at step 104 for the write request to be issued to write the copied data to the destination memory region, the DMA control circuitry 24 selects destination memory system locations having addresses which are offset relative to the destination address by offset amounts corresponding to positions of enable indications set to the enable state within the destination DMA template. At step 106 the DMA control circuitry 24 generates a set of DMA memory access requests to copy data from the source memory system locations to the destination memory system locations that were selected at steps 102 and 104. The generated DMA memory access requests may be queued within read/write queues 30 until they are able to be issued via the memory access interface 32 to the memory system.

While FIG. 9 shows a sequential flow diagram with step 106 occurring after steps 102 and 104, it is possible for the steps to take place at least partially in parallel, with step 106 being overlapped with steps 102 and/or 104 so that some of the earlier DMA memory access requests may start to be issued at step 106 while the DMA control circuitry 24 is still selecting source or destination memory system locations to be specified in later DMA memory access requests. Also, selection of the source and destination memory system locations could take place at least partially in parallel.

Figure 10:
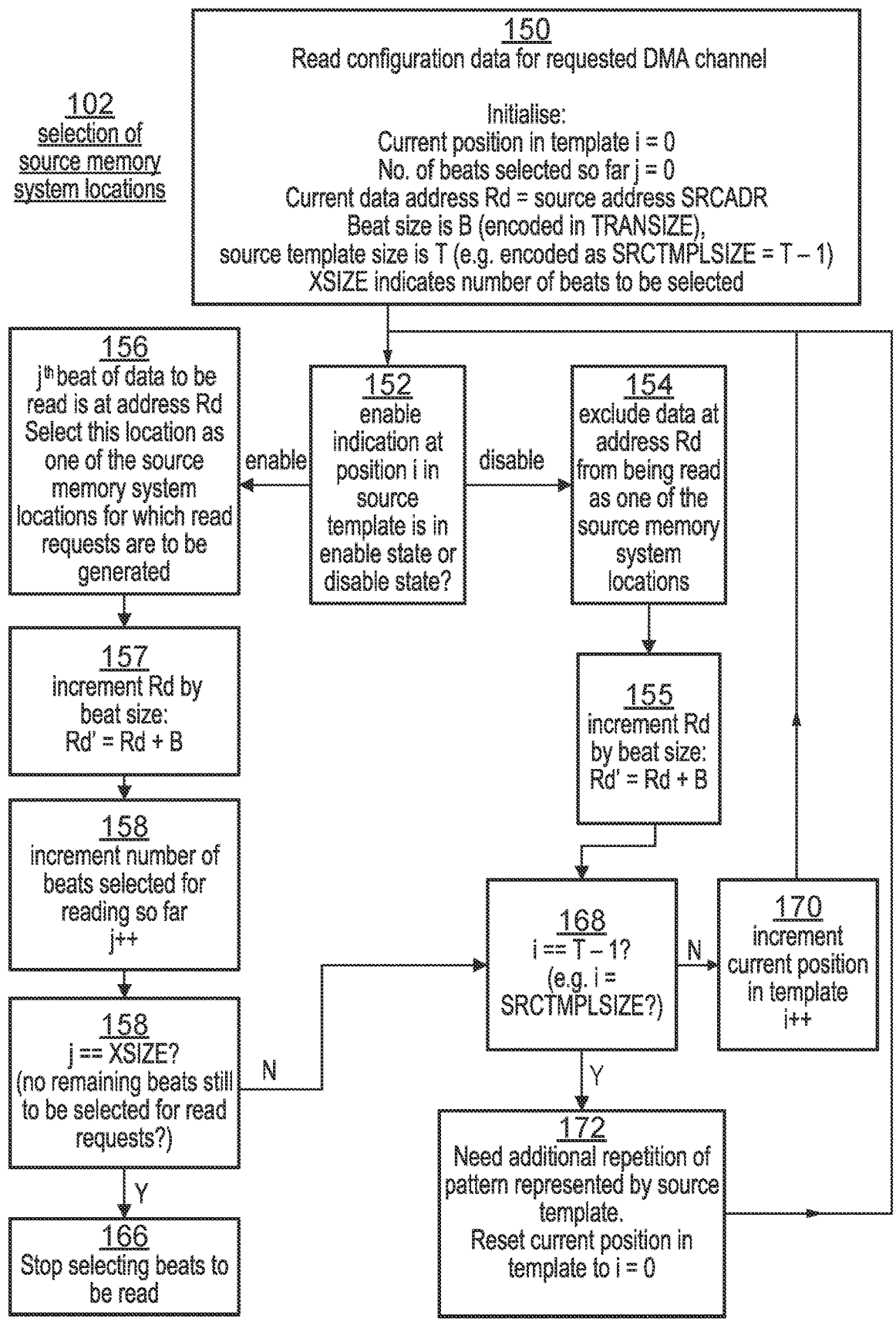
FIG. 10 is a flow diagram showing an example of selecting source memory system locations.

FIG. 10 is a flow diagram showing in more detail the step 102 for selecting the source memory system locations, in an example which supports 1D transfers using the channel configuration data shown in the example of FIG. 2. At step 150 of FIG. 10, the DMA control circuitry 24 reads the configuration data from registers 26 that is associated with the channel number specified for the DMA command received at step 100 of FIG. 9. At step 150 the DMA control circuitry 24 initialises various parameters used to control the selection of source memory system locations. A template position counter i, used to track the current position reached in the source DMA template 52, is initialised to 0. A beat counter j, used to track the number of beats of data selected for copying so far, is also initialised to 0. A current data address Rd is initialised to equal the source address specified for the DMA command. A beat size B is determined based on the encoding of the transaction size parameter TRANSIZE. A source template size T is determined from the encoding of the source template size parameter (for example, with the encoding discussed above where the source template size parameter is the actual template size minus 1, then T equals the source template size parameter plus 1). The DMA control circuitry 24 also determines the target number of beats to be selected, based on the XSIZE parameter from the channel configuration data 50 associated with the current DMA channel.

At step 152, the DMA control circuitry 24 determines whether the enable indication at position i (indicated by the current template position counter) within the source template 52 is in the enable state or the disable state. If the enable indication at position i is in the disable state then at step 154 the data at address Rd is excluded from being read as one of the source memory system locations, and at step 155 the current data address Rd is incremented by the beat size B.

If at step 152 the enable indication at position i in the source DMA template 52 is determined to be in the enable state, then at step 156 the $j^{th}$ beat of data to be read is determined to be at address Rd. Hence, the memory system location at address Rd is selected as one of the source memory system locations for which read requests are to be generated. At step 157, the current data address Rd is incremented by the beat size B. Also, at step 158 the beat counter j tracking the number of beats selected for reading so far is incremented. At step 160 the DMA control circuitry 24 determines whether the beat counter (after the increment) equals the target number of beats XSIZE. In other words, the DMA control circuitry 24 determines whether there are no remaining beats still to be selected. If no beats remain to be selected, then at step 166 the DMA control circuitry 24 stops selecting additional beats to be read and no further source memory system locations need to be selected for the current channel of DMA transfer.

If either at step 152 the enable indication at position i in the source template was determined to be in the disable state so that steps 154 and 155 are performed, or the enable indication at position i in the source template was in the enable state but at step 160 it was found that there is still at least one remaining beat to be selected (as beat counter j is still less than XSIZE), then the method proceeds to step 168 where it is determined whether the template position counter i has reached the end of the template. That is, it is determined whether i=T−1, where T is the source template size. Alternatively, with the encoding discussed above it could be determined whether i equals the value of the source template size parameter SRCTMPLSIZE If the end of the template has not yet been reached, then at step 170 the current template position counter i is incremented to advance to the next position of the template, and then the method returns to step 152 to check the enable indication at the next position in the template.

If at step 168 it is determined that the end of the template has been reached, then as it has already been determined at step 160 that at least one additional beat still needs to be selected, then at step 172 the DMA control circuitry 24 determines that an additional repetition of the pattern represented by the source template is needed and so the current position counter i is reset to 0 and then the method proceeds to back to step 152 to check the enable indication at position i=0 once more. Hence, this may result in an additional instance of the pattern represented by the template, being applied to addresses offset by B*T from the addresses at which the pattern was applied in the previous repetition.

Note that the method of FIG. 10 can reach step 166 and terminate the selection of source memory system locations before the complete pattern of the final instance of repeating the source template pattern has been completed. Hence, the final repetition may be truncated if the value of XSIZE is not an exact multiple of the number of enable indications set to the enable state within the source template.

Figure 11:
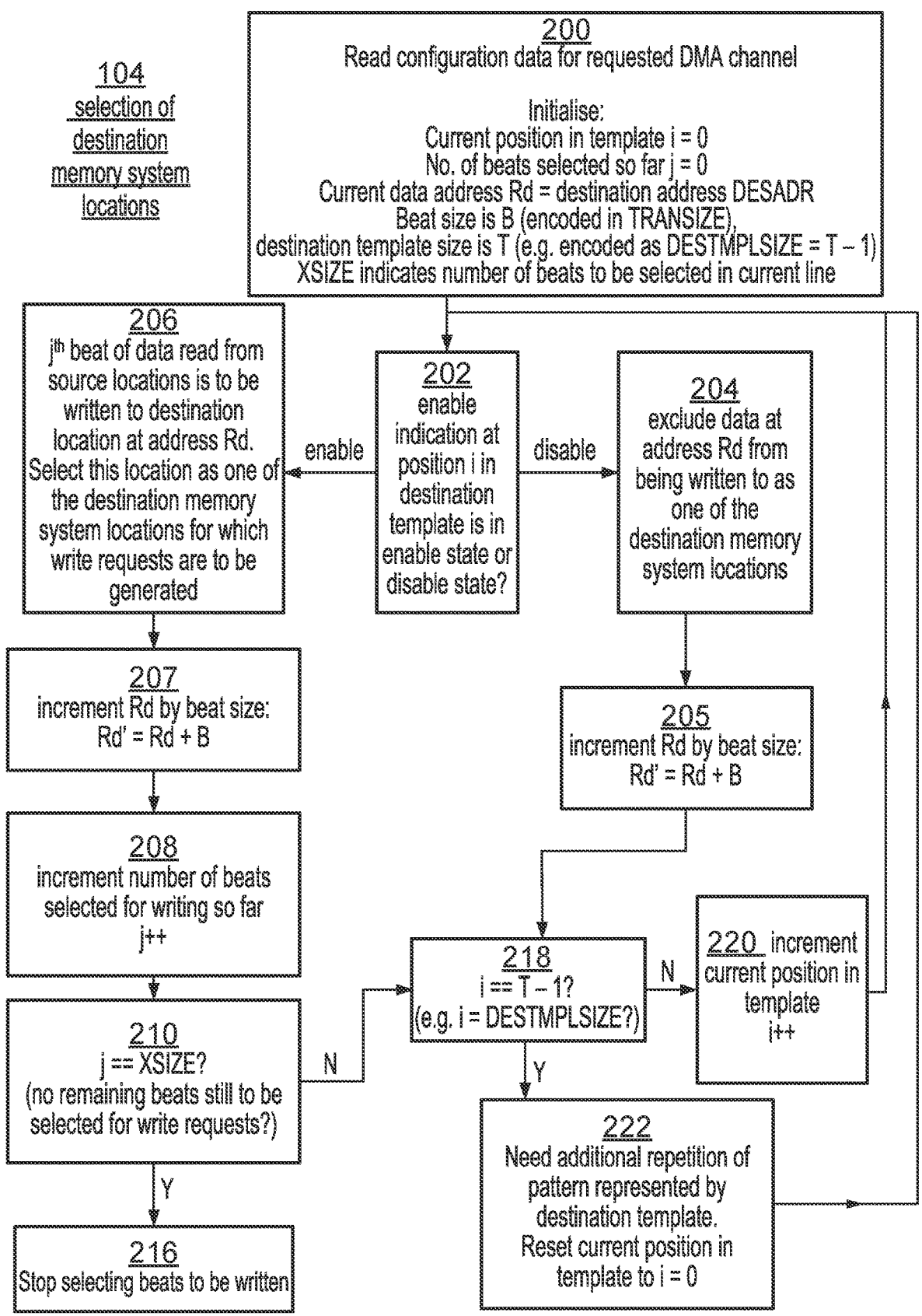
FIG. 11 is a flow diagram showing an example of selecting destination memory system locations.

FIG. 11 is a flow diagram showing corresponding operations performed at step 104 for selection of the destination memory system locations for the DMA transfer. FIG. 11 mirrors FIG. 10, but at step 200 the current data address Rd is set to the destination address instead of the source address, and the destination template size T is set based on the destination template size parameter DESTMPLSIZE Otherwise, step 200 is the same as step 150 of FIG. 10.

The remaining steps of FIG. 11 are the same as the corresponding steps of FIG. 10, except that the destination template is used instead of the source template, and the selection is of memory system locations to be specified in write requests to write data to memory, rather than read requests to read data from memory as in FIG. 10.

Hence, having initialised the parameters, at step 202 of FIG. 11 the DMA control circuitry 24 checks the enable indication at position i in the destination template to determine whether it is in the enable state or the disable state, and if in the disable state then at step 204 the data at current data address Rd is excluded from being written to as one of the destination memory system locations and at step 205 the current data address Rd is incremented by the beat size B.

If the enable indication at position i in the destination DMA templates is in the enable state, then at step 206 the $j^{th}$ beat of data read from the source locations is to be written to the destination location at address Rd. Note that this will mean that the beats of data read from the source locations will be preserved in the same relative order when they are written to the destination locations, although the address intervals between successive beats of data may change. Hence, the destination location selected at step 206 becomes one of the destination memory system locations for which write requests are to be generated. At step 207 the current data address Rd is incremented by the beat size B and at step 208 the number of beats selected for writing j is incremented.

Step 210 of FIG. 11 is the same as step 160 of FIG. 10 to check whether there are any remaining beats still to be selected, and if there are no remaining beats because the beat counter j is equal to the target number of beats XSIZE, then at step 216 the DMA control circuitry 24 stops selecting beats to be written and no further destination memory system locations will be selected. If there is at least one remaining beat still to be written, then following step 210 the method proceeds to step 218. The method can also arrive at step 218 after performing steps 204, 205 in the case when DMA enable indication at position i in the destination template is in the disable state. Either way, at step 218 it is determined whether the position counter i has reached the end of the template in the same way as at step 168, but this time the template size is derived from the destination template size parameter DESTMPLSIZE instead of the source template size parameter SRCTMPLSIZE If the end of the template has not yet been reached then at step 220 the current position counter i is incremented, while if the end of the template has been reached then at step 222 an additional repetition of the pattern represented by the destination template is needed and so the current position in the template is reset to i=0. Either way, following steps 220 or 222 then the method returns to step 202 to check the enable indication for the next position in the template.

It will be appreciated that although FIGS. 10 and 11 show sequential sequences of operation, this is merely for understanding and it is possible for some of these operations to be implemented at least partially in parallel or in a different order. For example, different bits of the template could be checked in parallel, or in a pipelined manner with some of the operations overlapped with others for a different template position. Hence, it is not essential to perform the exact method of FIGS. 10 and 11. Any set of operations which results in the same pattern of addresses being selected for the source or destination memory system locations could be used.

The above examples apply the source and destination templates as a 1-dimesional (1D) template, which is useful for cases when the beats of data to be copied are extracted from a linear 1D data structure which is a contiguous array of data extending in one dimension, from which certain selected elements are to be extracted and copied. However, sometimes data stored in memory may represent a 2-dimensional data structure such as a table or matrix and it may be desirable to extract sparsely located elements from a certain tile of the matrix structure while skipping over other parts of the matrix which may be stored at addresses which are between the respective rows or columns of the portion of interest. The examples discussed below provide support for the DMA controller to handle use of DMA templates even when 2-dimensional access patterns are desired.

Figure 12:
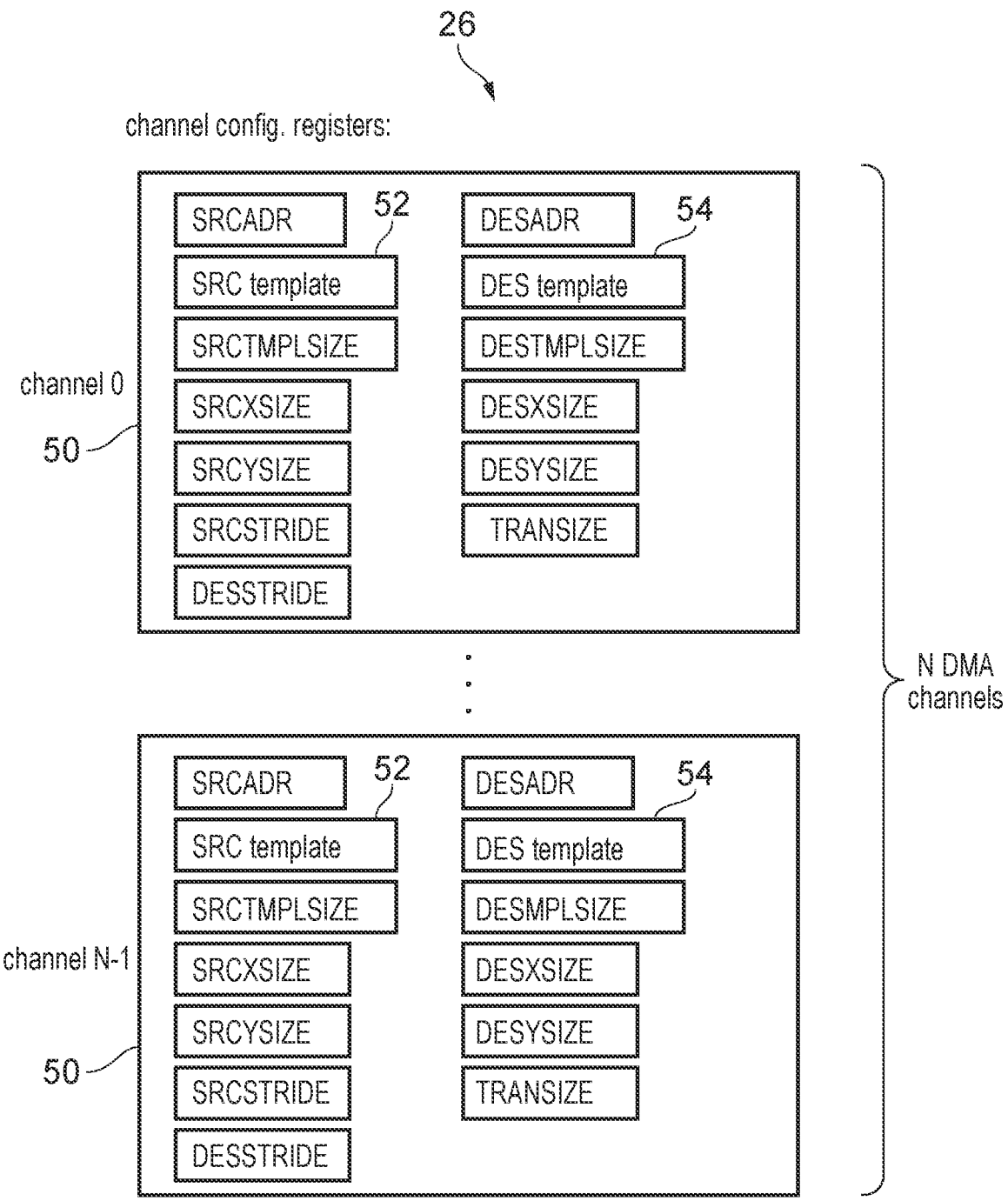
FIG. 12 shows another example of channel configuration data supporting two-dimensional (2D) application of a DMA template.

As shown in FIG. 12, to support the 2D transfers the channel configuration data 50 shown earlier can be expanded to include some additional parameters. The source and destination addresses SRCADR, DESADR, source and destination templates 52, 54, source and destination template size parameters SRCTMPLSIZE, DESTMPLSIZE, and transaction size parameter TRANSIZE are the same as discussed earlier in FIG. 2.

The XSIZE parameter indicating the target number of beats in FIG. 2 is replaced in FIG. 12 with first and second source size parameters SRCXSIZE, SRCYSIZE and first and second destination size parameters DESXSIZE, DESYSIZE. Also, additional configuration parameters indicating a source stride value SRCSTRIDE and a destination stride value DESSTRIDE are provided. In this particular example, separate parameters for source and destination are provided for both XSIZE and YSIZE, but as explained later, alternative embodiments could share a common XSIZE parameter for both source and destination and a common YSIZE parameter for both source and destination.

FIG. 13 schematically illustrates how the 2D channel configuration parameters can be used to control patterns of accesses. As shown in FIG. 13, the data from a 2D structure such as a matrix may be laid out in memory so that data in one dimension of the matrix (e.g. row direction) is laid out in consecutive addresses in memory while data extending in the other matrix dimension (e.g. column direction) is stored at addresses which are offset from each other by the stride value. Below, the term "line" will be used to refer to the dimension of the 2D structure for which consecutive elements are disposed at consecutive addresses in memory, but it will be appreciated that the line could be either a row or a column, depending on whether a table is represented in row-major layout (with the elements within the same row mapped to consecutive addresses and the elements within the same column at non-consecutive addresses) or column-major layout (with the elements within the same column mapped to consecutive addresses and the elements within the same row at non-consecutive addresses).

The software executing on the CPU 4 may wish to use the DMA controller 6 to control copying of sparsely located elements from within a certain tile of the matrix so that elements are extracted from that tile, but a certain part of each line of the matrix is ignored for the purpose of extracting the beats of data. This means there is a gap between the successive ranges of addresses from which data is to be extracted. The first and second source/destination size parameters effectively indicate the dimensions in the X and Y directions of the tile from which the sparsely located data is to be extracted (where X is the "line" dimension and Y is the opposite dimension), and the stride value for the source or destination transfer indicates the offset between one row and the next. It is possible for the source and destination parameters for the DMA transfer to define different dimensions for the first and second size parameters or to define different strides so that a rearrangement of data can be provided when copying the data. The source and destination DMA templates may define a certain pattern of access that can be repeated across lines of the matrix structure. In the example of FIG. 13 the access pattern is the same for each line, so that for example the first, third and seventh elements of each line may be copied but other elements ignored.

As shown in FIG. 14, when viewed in terms of accesses to a linear address space, the 2D template application may be interpreted as follows: as in the 1D case, for a first range of addresses the 2D template may define offsets relative to the source or destination address at which memory system locations are to be selected. Rather than indicating the total target number of beats to be transferred as in the XSIZE parameter in FIG. 2, the first source/destination size parameter SRCXSIZE, DESXSIZE now indicates the target number of beats to be transferred within a single address range, with the SRCYSIZE, DESYSIZE indicating the number of such address ranges for which transfers are to be initiated, and the SRCSTRIDE, DESSTRIDE parameter indicating the stride offset between the start of one of those address ranges and the next, so that it is now possible to initiate transfers in a number of discontiguously located address ranges, in a single channel of DMA transfers initiated using a single DMA command. In the example of FIG. 14, the pattern of accesses represented by the template is reset for each non-contiguous range, so that bit 0 of the template is used to determine whether to read/write the beat of data at the start address of each non-contiguous range, bit 1 is used to determine whether the read/write the next beat of data, and so on.

Hence, with this approach the templates can be used to control sparse access patterns within a tile of a 2D structure, with much less configuration overhead from the CPU 4 due to the use of the template which enables irregular patterns of accesses within each line of the 2D structure to be implemented with a single DMA command.

FIG. 15 shows another example of selecting source memory system locations at step 102 of FIG. 9, when implementing the 2D application of the templates as shown in FIGS. 12 to 14. Note that the template itself is exactly the same regardless of whether it is applied as a 1D or a 2D template, but the 2D template application is controlled based on the additional channel configuration parameters as shown in FIG. 12. FIG. 15 corresponds to the steps shown in FIG. 10, but with some additional operations as follows.

At step 250 of FIG. 15, the parameters of the DMA control circuitry 24 are initialised in the same way at step FIG. 10, except this time an address range counter k is initialised to 0 to track the number of lines of the 2D structure processed so far. Also, to support applying the stride offset between the start of the separate ranges, the range start address R derived from the source address SRCADR is retained, separate from the current data address Rd parameter used to track the address of the current beat of data reached, so that the stride offset can be applied to the range start address R even after the current data address Rd has been incremented as the template bits are processed. Also, instead of initialising a single parameter XSIZE indicating the total number of beats to be selected, the DMA control circuitry 24 reads the first and second source size parameters SRCXSIZE and SRCYSIZE which indicate the number of beats to be selected for a current address range and a number of lines to be selected respectively. Also, the DMA control circuitry 24 reads the source stride value SRCSTRIDE for the requested DMA channel which indicates the address stride between ranges associated with different lines.

Steps 252, 254, 255, 256, 257, 258, and 260 are the same as steps 152, 154, 155, 156, 157, 158, and 160 of FIG. 10 respectively. Note that, although the comparison of j with SRCXSIZE at step 260 is the same as at step 160 of FIG. 10, rather than checking whether there are any remaining beats to be selected in total as at step 160, step 260 is checking whether there are any remaining beats still to be selected in the current address range being processed, and there could still be remaining beats to be selected in other ranges even once j=SRCXSIZE for the current address range.

If at step 260 it is determined that there is still at least one beat remaining to be selected in the current address range then the method proceeds to step 268 and steps 268, 270, 272 of FIG. 15 are the same as the corresponding steps 168, 170, 172 of FIG. 10 which control advancement of the current position in the template and, if necessary, applying an additional repetition of the pattern represented by the source template within the current address range being processed.

However, at step 260 of FIG. 15 if it is determined that the beat counter j has reached the specified number of beats to be selected in the current address range, as indicated by SRCXSIZE, then at step 262 this means that the current address range is completed and so to move to the next address range, the current template position i is reset to zero, the number of beats selected in the current address range so far j is reset to zero and the number of address ranges processed so far k is incremented. The range start address R is incremented by the source stride value SRCSTRIDE and the current data address Rd is reset to match the new value of the range start address R' after the stride increment. At step 264 the DMA control circuitry 24 determines whether the address range counter k has reached the number of lines indicated by the second source size parameter SRCYSIZE, and if so then at step 266 the DMA control circuitry 24 can stop selecting beats to be read as all the required address ranges have been processed. If there is still a remaining address range to be processed (k<SRCYSIZE) then after step 264 the method returns to step 252 to check the enable indication at the first location of the destination template for an application of the template for the next line. Hence, note that if SRCXSIZE indicates a number of beats which is not an exact multiple of the number of enable indications set to the enable state within the active region of the source template then the effect of steps 260 to 264 will be to truncate the final instance of repeating the source template pattern within each address range. The pattern applied in each address range (e.g. in each line of the matrix structure) will be consistent across address ranges, as the current template position is reset to zero before moving onto the next line.

Similarly, FIG. 16 shows steps for selecting the destination memory system locations at step 104 of FIG. 9 in an example which uses the 2D application of the template. FIG. 16 mirrors FIG. 11 but with some additional steps to handle the 2D application. At step 300 of FIG. 16 the parameters of the DMA control circuitry 24 are initialised based on the channel configuration information of the requested DMA channel and is the same at step 200 except that the range counter k is initialised to 0, the range start address R is initialised to DESADR and Rd initialised to match R, and instead of initialising XSIZE, the DMA control circuitry 24 initialises the parameters DESXSIZE, DESYSIZE and DESSTRIDE based on the corresponding parameters in the channel configuration data, to indicate respectively the number of beats to be selected for writing in one address range, the number of address ranges to be processed, and the stride offset between respective address ranges.

Steps 302, 304, 305, 306, 307, 308 and 310 are the same as the corresponding steps 202, 204, 205, 206, 207, 208, 210 of FIG. 11, although at step 310 this is checking the number of remaining beats to be written for the current address range rather than the number of beats to be written in total. Again, if there are still remaining beats in the current address range then steps 318, 320, 322 of FIG. 16 are the same as the corresponding steps 218, 220, 222 of FIG. 11.

If at step 310 it is determined that there are no remaining beats in the current address range still to be selected for write requests, then at step 312 the current address range is determined to be complete and the DMA control circuitry 24 moves to processing of the next address range, and so resets to current position counter i and the beat counter j to 0 and increments the address range counter k. Also, the range start address R is incremented by the destination stride value to produce an updated start address R' and the current data address Rd is set to the updated value of the range start address R'. If at step 314 it is determined based on the address range counter that there are no remaining address ranges to be selected for write requests then at step 316 the DMA control circuitry 24 stops selecting beats to be written while otherwise if there is still a remaining line to be processed then the method returns to step 302 to start applying the template to the next address range.

It will be appreciated that the 2D examples of FIGS. 15 and 16 may provide the same functionality as the 1D examples if the second source and destination size parameters SRCYSIZE and DESYSIZE are set to 1 to indicate that only one address range needs to be selected. Hence, a DMA controller implementation which supports the 2D example will also support the 1D example.

In the example of FIGS. 14-16, the template pattern is reset at the start of each non-contiguous address range, because i is reset to 0 at steps 262, 312 of FIGS. 15 and 16.

However, as shown in FIG. 17, it is also possible to allow an instance of applying the pattern to wrap over from the end of one address range to the start of the next address range, without resetting the current template position i when starting to process the next address range. This could be useful if the pattern needs to cycle through different patterns repeating with a unit of repetition corresponding to multiple lines of the data structure stored in memory, for example.

Hence, FIGS. 18 and 19 show modified versions of FIGS. 15 and 16 which can be used if it is desired to allow the template to span across multiple address ranges. FIGS. 18 and 19 are the same as FIGS. 15 and 16, except that steps 262, 312 are replaced with modified versions 262', 312' which do not reset the template position counter i but otherwise are the same as steps 262, 312. Also, in FIGS. 18 and 19, steps 264, 314 are replaced with modified steps 264', 314' which perform the same check of whether the range counter k equals SRCYSIZE or DESYSIZE, but which, in the case where the comparison of the range counter identifies that there is still at least one remaining range to be processed, the method proceeds to steps 268, 318 instead of 252, 314 to check whether the end of the template has been reached, and if the end of the template has not been reached then the method continues to steps 270, 320 so that when steps 252, 302 are performed for the first data address Rd=R' of the new address range, the template position used to determine whether to read/write the beat of data at address R' can be a position other than position i=0, so that the template pattern wraps around across multiple ranges. Otherwise, FIGS. 18 and 19 are the same as FIGS. 15 and 16.

For implementations which support 2D application of DMA templates, some implementations of the DMA controller 6 may support the approach of FIGS. 14-16 and others may support the approach of FIGS. 17-19. Other implementations of the DMA controller 6 may support both approaches with a configuration parameter of the DMA configuration data in registers 26 indicating which approach is to be used.

In the examples of FIGS. 12 to 19, separate XSIZE and YSIZE parameters are defined for the source and destination respectively. In many cases, the user configuring the DMA transfer may wish each element taken from a source memory system location to be transferred to a corresponding destination memory system location, so that the total number of beats to be read from the source memory system locations is the same as the total number of beats to be written to the destination memory system locations. For example, the user may configure the channel configuration data so that SRCXSIZE*SRCYSIZE=DESXSIZE*DESYSIZE, to ensure that the number of beats is the same at both source and destination. On other occasions the user could configure the channel configuration registers 26 so that SRCXSIZE*SRCYSIZE does not equal DESXSIZE*DESYSIZE. If DESXSIZE*DESYSIZE<SRCXSIZE*SRCYSIZE then the writing of the beats to the destination memory system locations can be halted before all beats read from the source memory system locations have been consumed. If DESXSIZE*DESYSIZE>SRCXSIZE*SRCYSIZE, then the excess destination memory system locations could be populated in different ways, e.g. by filling them with predetermined values (e.g. 0), filling them with randomly generated data, or filling them with a repetition of the same set of source data read from the source memory system locations (with the last option of repeating the source data, the "$j^{th}$ beat of data" in step 306 of FIG. 16 or 19 could be interpreted as the (j modulo Ns)$^{th}$ beat of data read from the source locations, where Ns is the number of source beats to be read corresponding to SRCXSIZE*SRCYSIZE).

However, it is not essential for XSIZE and YSIZE to be defined separately for the source and destination, and in other examples a common XSIZE parameter could be shared between source and destination, and a common YSIZE parameter could be shared between source and destination. This would constrain the 2D data structure to have the same size and dimensions at both source and destination. In this case, the DMA controller would function in the same way as shown in FIGS. 12 to 19 except that SRCXSIZE=DESXSIZE=XSIZE (where XSIZE is the common first source/destination size parameter) and SRCYSIZE=DESYSIZE=YSIZE (where YSIZE is the common second source/destination size parameter).

Similarly, it will be appreciated that, although the example of FIGS. 2 to 11 for the 1D template application is shown with a single parameter XSIZE shared between source and destination, the 1D example could also be extended to have separate SRCXSIZE, DESXSIZE parameters for the source and destination respectively, again allowing different numbers of beats to be specified for the source and destination respectively, with truncation of the writing of source data to the destination memory system locations early if SRCXSIZE>DESXSIZE; and if SRCXSIZE<DESXSIZE, filling of remaining destination memory system locations with a predetermined value, random data, or with a repetition of the data read from the source memory system locations. With a 1D example with separate specification of XSIZE for the source and destination, the DMA controller would function in the same way as shown in FIGS. 2 to 11, except that, at steps 150, 158 of FIG. 10 references to XSIZE would refer to SRCXIZE and at steps 200, 210 of FIG. 11 references to XSIZE would refer to DESXSIZE, and at step 156 if SRCXSIZE<DESXISZE and repetition of the source data is used when writing to the excess destination locations, the "$j^{th}$ beat of data" in step 206 of FIG. 11 could be interpreted as the (j modulo SRCXSIZE)$^{th}$ beat of data read from the source locations.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may embody computer-readable representations of one or more netlists. The one or more netlists may be generated by applying one or more logic synthesis processes to an RTL representation. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A direct memory access (DMA) controller comprising:
a command interface to receive DMA commands;
DMA control circuitry to generate DMA memory access requests to be issued to a memory system, based on the DMA commands; and
template storage circuitry to store at least one DMA template indicative of a DMA data access pattern, each DMA template comprising a plurality of enable indications each settable to one of an enable state and a disable state; in which:
in response to a DMA command associated with a source address, a destination address, a source DMA template, and a destination DMA template, the DMA control circuitry is configured to generate a set of DMA memory access requests to copy data from a plurality of source memory system locations to a plurality of destination memory system locations, in which:
the DMA control circuitry is configured to select the plurality of source memory system locations to have addresses which are offset relative to the source address by offset amounts corresponding to positions of enable indications set to the enable state within the source DMA template;
the DMA control circuitry is configured to select the plurality of destination memory system locations to have addresses which are offset relative to the destination address by offset amounts corresponding to positions of enable indications set to the enable state within the destination DMA template;
when a number of enable indications set to the enable state in the source DMA template is less than a number of beats indicated by a first source size parameter, the DMA control circuitry is configured to repeat the data access pattern represented by the source DMA template; and when a number of enable indications set to the enable state in the destination DMA template is less than a number of beats indicated by a first destination size parameter, the DMA control circuitry is configured to repeat the data access pattern represented by the destination DMA template.

2. The DMA controller according to claim 1, in which the DMA control circuitry is configured to exclude, from the plurality of source memory system locations, a memory system location having an address which is offset relative to the source address by an offset amount corresponding to a position of an enable indication set to the disable state within the source DMA template; and the DMA control circuitry is configured to exclude, from the plurality of destination memory system locations, a memory system location having an address which is offset relative to the destination address by an offset amount corresponding to a position of an enable indication set to the disable state within the destination DMA template.

3. The DMA controller according to claim 1, in which the DMA control circuitry is configured to use a same DMA template as both the source DMA template and the destination DMA template.

4. The DMA controller according to claim 1, in which the DMA control circuitry is configured to support the destination DMA template being different to the source DMA template.

5. The DMA controller according to claim 1, in which the DMA control circuitry is configured to generate the set of DMA memory access requests to maintain an address ordering of the copied data, so that when the copied data includes a first beat of data copied from a source memory system location having a first address and a second beat of data copied from a source memory system location having a second address greater than the first address, the set of DMA memory access requests causes the second beat of data to be copied to a destination memory system location having a greater address than a destination memory system location to which the first beat of data is copied.

6. The DMA controller according to claim 1, in which:
the DMA command is associated with a variable beat size, the copied data comprising a plurality of beats of data each having the variable beat size; and
the DMA control circuitry is configured to scale the offset amounts of the addresses of the source memory system locations and the destination memory system locations based on the variable beat size.

7. The DMA controller according to claim 1, in which when the number of beats indicated by the first source size parameter is a number other than an exact multiple of a number of enable indications set to the enable state in the source DMA template, the DMA control circuitry is configured to truncate a repetition of the data access pattern represented by the source DMA template; and when the number of beats indicated by the first destination size parameter is a number other than an exact multiple of a number of enable indications set to the enable state in the destination DMA template, the DMA control circuitry is configured to truncate a repetition of the data access pattern represented by the destination DMA template.

8. The DMA controller according to claim 1, in which the DMA command is associated with a source template size parameter indicative of a variable size for the source DMA template, and the DMA control circuitry is configured to control repetition of the data access pattern represented by the source DMA template based on the source template size parameter; and the DMA command is associated with a destination template size parameter indicative of a variable size for the destination DMA template, and the DMA control circuitry is configured to control repetition of the data access pattern represented by the destination DMA template based on the destination template size parameter.

9. The DMA controller according to claim 1, in which at least one of:

when the source DMA template is applied as a one-dimensional template, the DMA control circuitry is configured to repeat the data access pattern represented by the source DMA template until sufficient source memory system locations have been selected to enable the number of beats indicated by the first source size parameter to be read; and when the destination DMA template is applied as a one-dimensional template, the DMA control circuitry is configured to repeat the data access pattern represented by the destination DMA template until sufficient destination memory system locations have been selected to enable the number of beats indicated by the first destination size parameter to be written.

10. The DMA controller according to claim 1, in which at least one of:

when the source DMA template is applied as a two-dimensional template, within each of a plurality of non-consecutive source ranges of addresses separated at intervals of a source stride value associated with the DMA command, the DMA control circuitry is configured to repeat the data access pattern represented by the source DMA template, the first source size parameter indicating the number of beats to be read from a given one of the plurality of non-consecutive source ranges, and the DMA command being associated with a second source size parameter specifying how many source ranges are in the plurality of non-consecutive source ranges; and when the destination DMA template is applied as a two-dimensional template, within each of a plurality of non-consecutive destination ranges of addresses are non-consecutive ranges of addresses separated at intervals of a destination stride value associated with the DMA command, the DMA control circuitry is configured to repeat the data access pattern represented by the destination DMA template, the first destination size parameter indicating the number of beats to be written to a given one of the plurality of non-consecutive destination ranges, the DMA command being associated with a second destination size parameter specifying how many destination ranges are in the plurality of non-consecutive destination ranges.

11. The DMA controller according to claim 1, in which the template storage circuitry is configured to store DMA templates for a plurality of channels of DMA transfer, the DMA command specifies a channel indication, and in response to the DMA command the DMA control circuitry is configured to select from the template storage circuitry the source DMA template and the destination DMA template associated with the channel indication specified by the DMA command.

12. The DMA controller according to claim 1, in which the command interface is responsive to receipt of a template configuration command to update at least one DMA template stored in the template storage circuitry.

13. A system comprising:
the DMA controller according to claim 1; and
processing circuitry to execute program instructions according to an instruction set architecture, and to issue the DMA commands to the command interface of the DMA controller.

14. A method for controlling direct memory access (DMA), the method comprising:
receiving a DMA command associated with a source address, a destination address, a source DMA template, and a destination DMA template, the source DMA template and the destination DMA template each comprising a plurality of enable indications each settable to one of an enable state and a disable state, and in response to the DMA command:
selecting a plurality of source memory system locations having addresses which are offset relative to the source address by offset amounts corresponding to positions of enable indications set to the enable state within the source DMA template;
selecting a plurality of destination memory system locations to have addresses which are offset relative to the destination address by offset amounts corresponding to positions of enable indications set to the enable state within the destination DMA template; and
generating a set of DMA memory access requests to copy data from the plurality of source memory system locations to the plurality of destination memory system locations, in which:
in response to a number of enable indications set to the enable state in the source DMA template being less than a number of beats indicated by a first source size parameter, the data access pattern represented by the source DMA template is repeated; and
in response to a number of enable indications set to the enable state in the destination DMA template being less than a number of beats indicated by a first destination size parameter, the data access pattern represented by the destination DMA template is repeated.

15. A non-transitory, computer-readable medium to store computer-readable code for fabrication of a direct memory access (DMA) controller comprising:
a command interface to receive DMA commands;
DMA control circuitry to generate DMA memory access requests to be issued to a memory system, based on the DMA commands; and
template storage circuitry to store at least one DMA template indicative of a DMA data access pattern, each DMA template comprising a plurality of enable indications each settable to one of an enable state and a disable state; in which:
in response to a DMA command associated with a source address, a destination address, a source DMA template, and a destination DMA template, the DMA control circuitry is configured to generate a set of DMA memory access requests to copy data from a plurality of source memory system locations to a plurality of destination memory system locations, in which:
the DMA control circuitry is configured to select the plurality of source memory system locations to have addresses which are offset relative to the source address by offset amounts corresponding to positions of enable indications set to the enable state within the source DMA template;
the DMA control circuitry is configured to select the plurality of destination memory system locations to have addresses which are offset relative to the destination address by offset amounts corresponding to positions of enable indications set to the enable state within the destination DMA template;
when a number of enable indications set to the enable state in the source DMA template is less than a number of beats indicated by a first source size parameter, the DMA control circuitry is configured to repeat the data access pattern represented by the source DMA template; and
when a number of enable indications set to the enable state in the destination DMA template is less than a number of beats indicated by a first destination size parameter, the DMA control circuitry is configured to repeat the data access pattern represented by the destination DMA template.

* * * * *